United States Patent
Glazko et al.

(10) Patent No.: US 8,315,191 B2
(45) Date of Patent: Nov. 20, 2012

(54) TIMING ACQUISITION AND MODE AND GUARD DETECTION FOR AN OFDM TRANSMISSION

(75) Inventors: Serguei A. Glazko, San Diego, CA (US); Jonathan R. Reeves, La Jolla, CA (US); Shimman Patel, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1268 days.

(21) Appl. No.: 11/392,266

(22) Filed: Mar. 28, 2006

(65) Prior Publication Data
US 2007/0086329 A1  Apr. 19, 2007

Related U.S. Application Data

(60) Provisional application No. 60/718,988, filed on Sep. 20, 2005.

(51) Int. Cl.
*H04B 7/005* (2006.01)
(52) U.S. Cl. ........................ 370/310; 455/296
(58) Field of Classification Search .......... 370/203–208, 370/310–350; 455/403, 73, 88, 550.1, 553.1, 455/561, 562.1; 375/219, 295, 299, 345
See application file for complete search history.

(56) References Cited

U.S. PATENT DOCUMENTS

| | | | | |
|---|---|---|---|---|
| 6,035,000 A * | 3/2000 | Bingham | | 375/296 |
| 6,108,353 A * | 8/2000 | Nakamura et al. | | 370/504 |
| 6,532,258 B1 * | 3/2003 | Goldston et al. | | 375/227 |
| 6,658,063 B1 * | 12/2003 | Mizoguchi et al. | | 375/260 |
| 6,993,083 B1 * | 1/2006 | Shirakata et al. | | 375/260 |
| 7,177,376 B2 * | 2/2007 | Atungsiri et al. | | 375/343 |
| 7,228,113 B1 * | 6/2007 | Tang et al. | | 455/101 |
| 7,352,730 B2 * | 4/2008 | Ghosh et al. | | 370/338 |
| 7,423,959 B2 * | 9/2008 | Gavillero Martin et al. | | 370/208 |
| 7,480,234 B1 * | 1/2009 | Hart et al. | | 370/208 |

(Continued)

FOREIGN PATENT DOCUMENTS

EP 0854620 A2 7/1998
(Continued)

OTHER PUBLICATIONS

International Search Report—PCT/US06/036625, International Search Authority—European Patent Office—Feb. 6, 2007.

(Continued)

*Primary Examiner* — Michael Thier
*Assistant Examiner* — Curtis A Alia
(74) *Attorney, Agent, or Firm* — Stanton Braden

(57) ABSTRACT

Techniques for detecting mode and guard length and estimating timing offset for an OFDM transmission are described. Multiple hypotheses for different combinations of mode and guard length that might have been used for the OFDM transmission are evaluated. For each hypothesis, correlation is performed on received samples for a hypothesized guard interval to obtain correlation results. The energy of the hypothesized guard interval is determined. A first metric is derived based on the correlation results and the energy. The first metric may be filtered, e.g., averaged. Noise is estimated, e.g., based on a set of elements for the filtered first metric at locations determined by an estimated timing offset for the hypothesis. A second metric is derived based on the filtered first metric and the estimated noise. The second metric for all hypotheses may be used to determine the mode, guard length, and timing offset for the OFDM transmission.

35 Claims, 11 Drawing Sheets

U.S. PATENT DOCUMENTS

| | | | |
|---|---|---|---|
| 7,499,508 B2 * | 3/2009 | Sayeed | 375/345 |
| 7,570,666 B2 * | 8/2009 | Wang | 370/503 |
| 2002/0110202 A1 | 8/2002 | Wilson et al. | |
| 2002/0181509 A1 * | 12/2002 | Mody et al. | 370/480 |
| 2002/0186791 A1 * | 12/2002 | Foxcroft et al. | 375/324 |
| 2003/0090994 A1 * | 5/2003 | Kakura | 370/208 |
| 2003/0219084 A1 * | 11/2003 | Parker | 375/343 |
| 2004/0120412 A1 * | 6/2004 | Banerjea | 375/260 |
| 2004/0179633 A1 * | 9/2004 | Shinoda et al. | 375/343 |
| 2004/0228272 A1 * | 11/2004 | Hasegawa et al. | 370/210 |
| 2004/0258098 A1 * | 12/2004 | Ohkubo et al. | 370/503 |
| 2005/0105659 A1 * | 5/2005 | Sheu et al. | 375/360 |
| 2005/0265488 A1 * | 12/2005 | Jung | 375/340 |
| 2006/0018413 A1 * | 1/2006 | Gupta | 375/343 |
| 2006/0140109 A1 * | 6/2006 | Lin | 370/208 |

FOREIGN PATENT DOCUMENTS

| | | | |
|---|---|---|---|
| EP | 1206096 A2 | 5/2002 | |
| JP | 10209998 A | 8/1998 | |
| JP | 2001036495 A | 2/2001 | |
| JP | 2002204405 A | 7/2002 | |
| JP | 2002368717 A | 12/2002 | |
| JP | 2003046472 A | 2/2003 | |
| WO | 0209383 A1 | 1/2002 | |
| WO | 2004012452 A1 | 2/2004 | |

OTHER PUBLICATIONS

Translation of Office Action in Japanese application 2008-532346 corresponding to U.S. Appl. No. 11/392,266, citing WO04012452, JP2002368717, JP10209998, JP2003046472, JP2002204405 and JP2001036495 dated Dec. 21, 2010.

Written Opinion—PCT/US06/036625, International Search Authority—European Patent Office—Feb. 6, 2007.

* cited by examiner

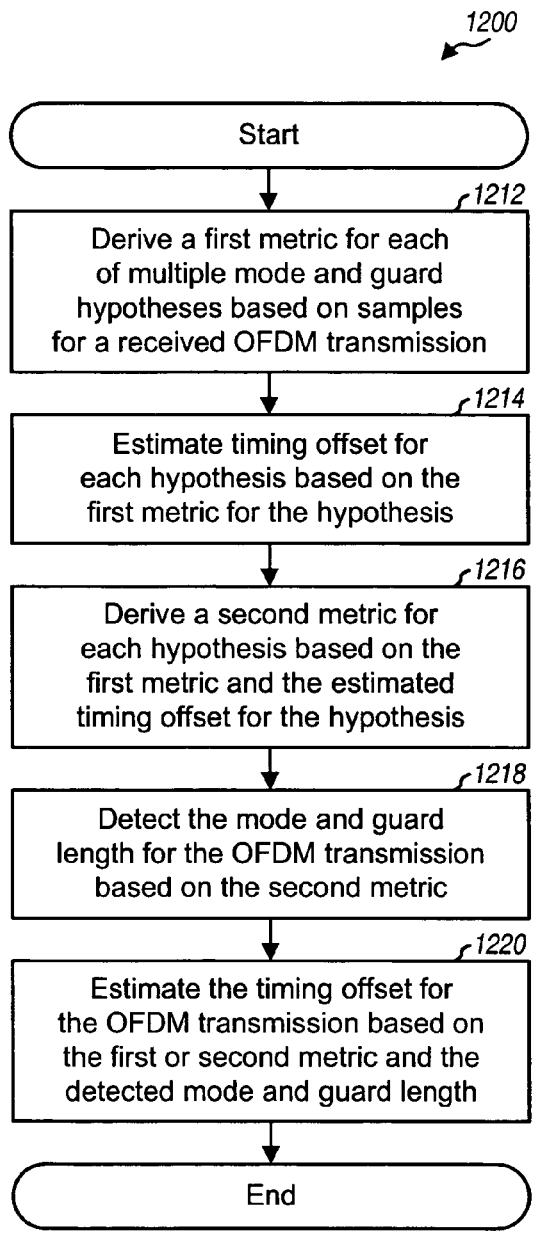
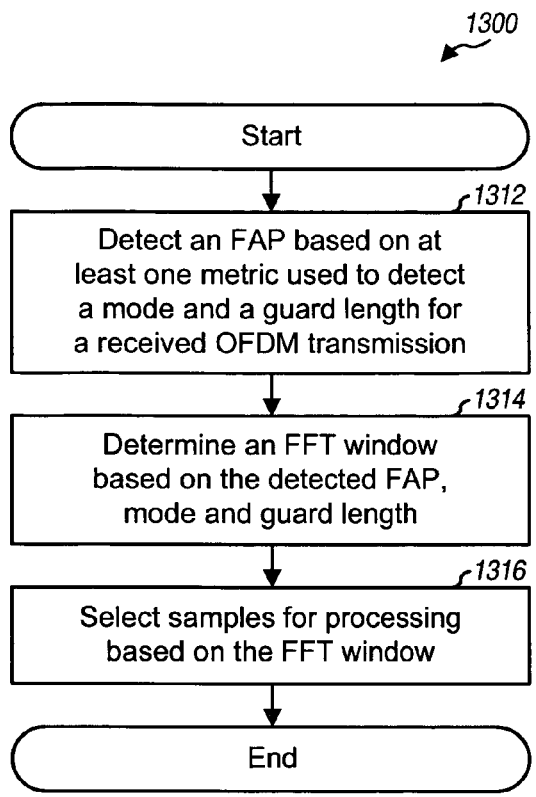
FIG. 12
FIG. 13

TIMING ACQUISITION AND MODE AND GUARD DETECTION FOR AN OFDM TRANSMISSION

The present application claims priority to provisional U.S. Application Ser. No. 60/718,988, entitled "FAST MODE, GUARD AND FIRST ARRIVING PATH ACQUISITION IN OFDM," filed Sep. 20, 2005, assigned to the assignee hereof and incorporated herein by reference.

BACKGROUND

I. Field

The present disclosure relates generally to communication, and more specifically to acquisition techniques for a communication system.

II. Background

Orthogonal frequency division multiplexing (OFDM) is a multi-carrier modulation technique that can provide good performance for some wireless environments. OFDM partitions the overall system bandwidth into multiple (K) orthogonal frequency subbands, which are also called carriers, subcarriers, tones, and so on. With OFDM, each subband is associated with a respective carrier that may be modulated with data.

In an OFDM system, a transmitter processes (e.g., encodes, interleaves, and modulates) traffic data to generate modulation symbols and further maps the modulation symbols to the K subbands. The transmitter then transforms the modulation symbols to the time domain and generates OFDM symbols. Each OFDM symbol contains a useful part and a guard interval, which is a repeated portion of the useful part. The OFDM system may support different modes for different values of K and different guard lengths for different guard interval durations. The transmitter would then generate the OFDM symbols in accordance with the mode and guard length selected for use. The transmitter transmits the OFDM symbols to receivers.

A receiver performs the complementary processing on the OFDM symbols received from the transmitter. The receiver typically first detects the mode and guard length used by the transmitter. The receiver then processes each received OFDM symbol in accordance with the detected mode and guard length. It is desirable to quickly and reliably detect the mode and guard length so that the processing of the received OFDM symbols can commence as soon as possible.

There is therefore a need in the art for techniques to detect mode and guard length in an OFDM system.

SUMMARY

Techniques for quickly and reliably detecting mode and guard length and estimating timing offset for a received OFDM transmission are described herein. The mode indicates the duration of the useful portion of each OFDM symbol. The guard length indicates the duration of the guard interval for each OFDM symbol. The timing offset indicates the start of each received OFDM symbol.

In an aspect, an improved metric is derived and used for mode detection, guard detection, and/or timing offset estimation. As used herein, a metric is a function of one or more known parameters and is used for quantitative assessment of one or more unknown parameters. In an embodiment, samples are obtained for a received OFDM transmission, and correlation is performed on the samples for a hypothesized guard interval to obtain correlation results. The energy of the hypothesized guard interval is also determined. A first/initial metric is derived based on the correlation results and the energy. The first metric may be filtered, e.g., by averaging. Noise is estimated, e.g., based on a set of elements for the first metric at locations determined by an estimated timing offset. A second/improved metric is then derived based on the filtered first metric and the estimated noise. The second metric may be used to detect the mode and guard length for the OFDM transmission as well as to estimate the timing offset for the OFDM transmission. The correlation, energy, and first metric may be efficiently computed as described below.

In another aspect, mode and guard detection and timing offset estimation are efficiently performed for a received OFDM transmission. At least one metric (which may be the first and/or second metric) is derived based on the samples and for multiple hypotheses. Each hypothesis corresponds to a specific combination of mode and guard length hypothesized for the OFDM transmission. The mode and guard length for the OFDM transmission are then detected based on the metric, e.g., by identifying the most likely hypothesis based on the metric and providing the mode and guard length for this hypothesis as the detected mode and guard length for the OFDM transmission. The timing offset for the OFDM transmission may also be estimated based on the metric. The samples are then processed in accordance with the detected mode and guard length and the estimated timing offset.

In yet another aspect, a first arriving path (FAP) is detected and a fast Fourier transform (FFT) window is placed in a manner to achieve good performance. The FAP may be detected based on the same metric(s) used to detect the mode and guard length for the OFDM transmission. In an embodiment, a threshold is computed based on a metric and a gain indicative of a target position for the FFT window. The FAP is then detected based on the metric and the threshold. The FFT window is determined based on the detected FAP, mode, and guard length. The FFT window has a width determined by the detected mode and is placed at a location determined by the detect FAP and guard length. Samples are selected for processing based on the FFT window.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIG. 12 shows a process to detect mode and guard length and to estimate timing offset for an OFDM transmission.

FIG. 13 shows a process for FAP detection and FFT window placement.

DETAILED DESCRIPTION

The word "exemplary" is used herein to mean "serving as an example, instance, or illustration." Any embodiment or design described herein as "exemplary"is not necessarily to be construed as preferred or advantageous over other embodiments or designs.

The acquisition techniques described herein may be used for various communication systems such as OFDM systems, orthogonal frequency division multiple access (OFDMA) systems, single-carrier frequency division multiple access (SC-FDMA) systems, and so on. An OFDMA system utilizes OFDM. In general, modulation symbols are sent in the frequency domain with OFDM and in the time domain with SC-FDMA.

For clarity, the acquisition techniques are specifically described below for two exemplary OFDM-based systems that implement Digital Video Broadcasting for Handhelds (DVB-H) and Integrated Services Digital Broadcasting for Terrestrial Television Broadcasting (ISDB-T). DVB-H and ISDB-T support digital transmission of multimedia over a terrestrial communication network. DVB-H is described in document ETSI EN 300 744, entitled "Digital Video Broadcasting (DVB); Framing Structure, Channel Coding and Modulation for Digital Terrestrial Television," November 2004 January 2001. ISDB-T is described in document ARIB STD-B31, entitled "Transmission System for Digital Terrestrial Television Broadcasting," July 2003. These documents are publicly available.

Figure 1:
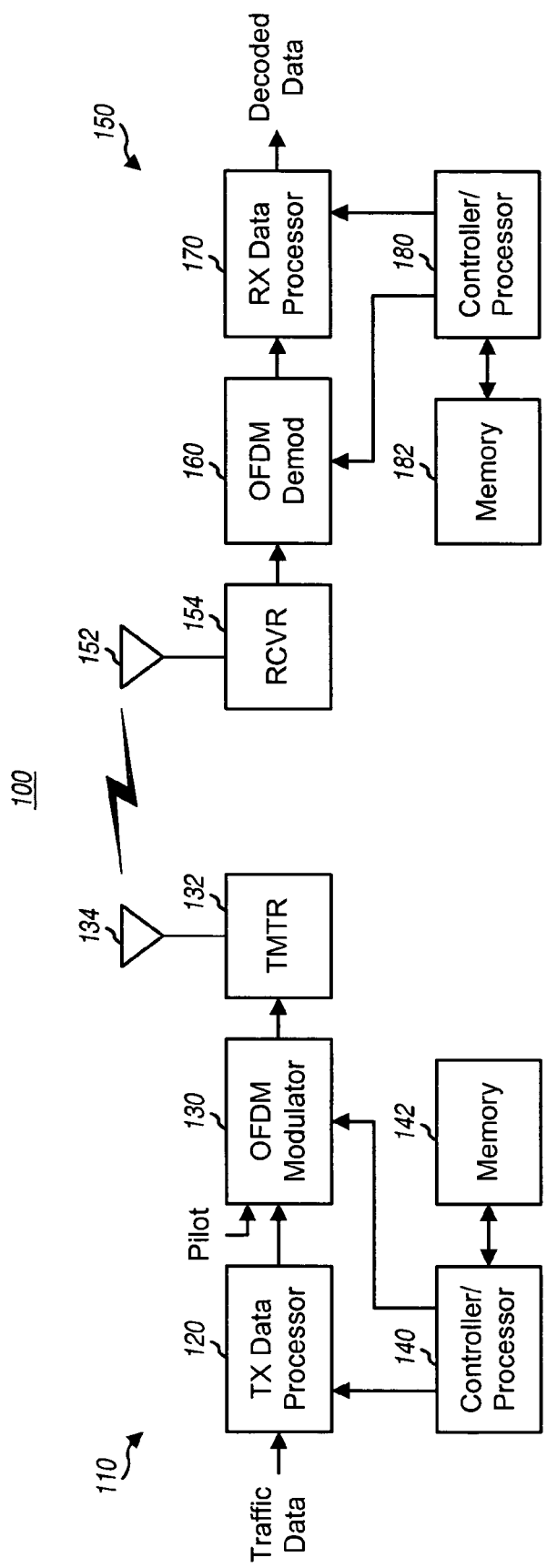
FIG. 1 shows a block diagram of a transmitter and a receiver.

FIG. 1 shows a block diagram of a transmitter 110 and a receiver 150 in an OFDM-based system 100, which may implement DVB-H, ISDB-T, and/or some other design. At transmitter 110, a transmit (TX) data processor 120 processes (e.g., formats, encodes, interleaves, and symbol maps) traffic data and generates data symbols. As used herein, a data symbol is a modulation symbol for traffic data, a pilot symbol is a modulation symbol for pilot, which is data that is known a priori by both the transmitter and receiver, and a zero symbol is a signal value of zero. An OFDM modulator 130 receives and multiplexes the data symbols and pilot symbols onto the proper subbands, performs OFDM modulation as described below, and provides an OFDM symbol in each OFDM symbol period. An OFDM symbol period (or simply, a symbol period) is the duration of one OFDM symbol. A transmitter unit (TMTR) 132 receives and processes (e.g., converts to analog, amplifies, filters, and frequency upconverts) the OFDM symbols and generates a modulated signal, which is transmitted via an antenna 134.

At receiver 150, an antenna 152 receives the modulated signal from transmitter 110 and provides a received signal to a receiver unit (RCVR) 154. Receiver unit 154 conditions (e.g., filters, amplifies, frequency downconverts, and digitizes) the received signal and provides samples. An OFDM demodulator 160 (Demod) detects the mode and guard length for the OFDM transmission and further estimates the timing offset in order to properly place an FFT window in each OFDM symbol period. OFDM demodulator 160 further processes the samples as described below and provides data symbol estimates, which are estimates of the data symbols sent by transmitter 110. A receive (RX) data processor 170 processes (e.g., symbol demaps, deinterleaves, and decodes) the data symbol estimates and provides decoded data. In general, the processing by OFDM demodulator 160 and RX data processor 170 is complementary to the processing by OFDM modulator 130 and TX data processor 120, respectively, at transmitter 110.

Controllers/processors 140 and 180 control the operation of various processing units at transmitter 110 and receiver 150, respectively. Memories 142 and 182 store data and program codes for transmitter 110 and receiver 150, respectively.

Figure 2:
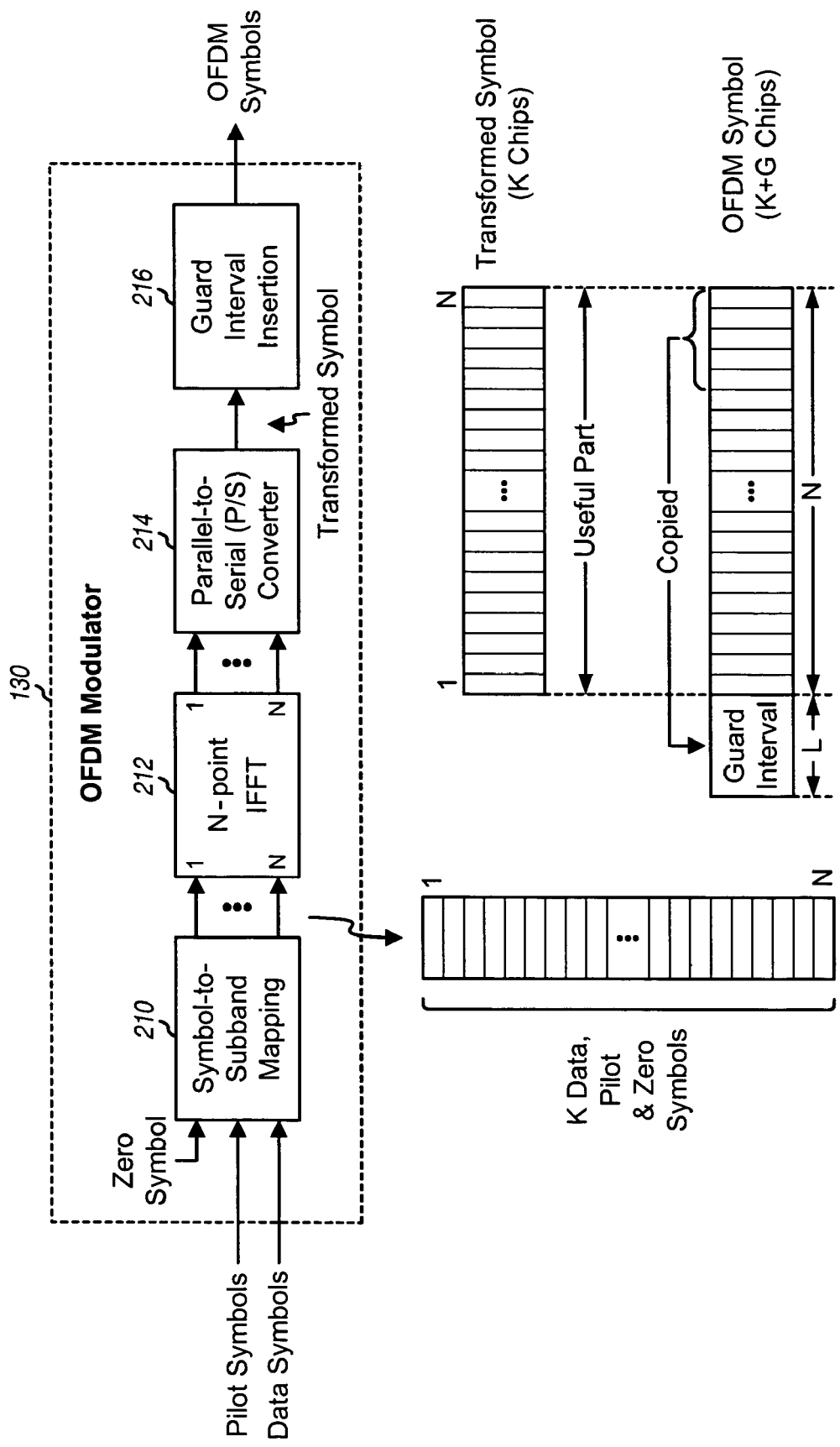
FIG. 2 shows a block diagram of an OFDM modulator at the transmitter.

FIG. 2 shows a block diagram of OFDM modulator 130 at transmitter 110 in FIG. 1. Within OFDM modulator 130, a symbol-to-subband mapping unit 210 receives and maps the data symbols and pilot symbols to K usable subbands, maps zero symbols to N−K unused subbands, and provides N transmit symbols for N total subbands. Each transmit symbol may be a data symbol, a pilot symbol, or a zero symbol. In each OFDM symbol period, a unit 212 transforms the N transmit symbols to the time domain with an N-point inverse fast Fourier transform (IFFT) or an inverse discrete Fourier transform (IDFT) and provides a transformed symbol that contains N time-domain chips. Each chip is a complex value to be transmitted in one chip period. A parallel-to-serial (P/S) converter 214 serializes the N chips for each transformed symbol. A guard interval insertion unit 216 then repeats a portion (or L chips) of each transformed symbol to form an OFDM symbol that contains N+L chips. Each OFDM symbol contains N chips for the useful part and L chips for the guard interval. The guard interval is used to combat intersymbol interference (ISI) and inter-carrier interference (ICI) caused by delay spread in a communication channel.

DVB-H supports three operating modes for FFT sizes of 2K, 4K and 8K. ISDB-T also supports three operating modes for FFT sizes of 256, 512 and 1K. DVB-H and ISDB-T also support four different guard lengths of ¼, ⅛, 1/16 and 1/32 of an OFDM symbol. Table 1 gives the values for some key parameters for the three modes in DVB-H and ISDB-T. In Table 1, rows 3 and 4 give the FFT sizes (in number of samples) and the number of usable subbands/carriers, respectively, for the three modes in DVB-H and ISDB-T. Rows 5 through 8 give the guard interval duration (in number of samples) for guard lengths of ¼, ⅛, 1/16 and 1/32 for the three modes in DVB-H and ISDB-T. In the following description, m is an index for mode and g is an index for guard length, where $m \in \{1, 2, 3\}$ and $g \in \{1, 2, 3, 4\}$. More specifically, g=1 for guard length of ¼, g=2 for guard length of ⅛, g=3 for guard length of 1/16, and g=4 for guard length of 1/32.

As shown in Table 1, the duration of the useful part (or the FFT size) is denoted as $N_m$ and is only dependent on mode m. The duration of the guard interval is denoted as $L_{m,g}$ and is dependent on both mode m and guard length g. The OFDM symbol duration $T_{m,g}$ for mode m and guard length g is equal to the FFT size $N_m$ for mode m plus the guard interval duration $L_{m,g}$ for guard length g, or $T_{m,g} = N_m + L_{m,g}$. For example, the OFDM symbol size for mode 2 with guard length of 1/16 in DVB-H is $T_{2,3} = 4096 + 256 = 4352$. Column 7 of Table 1 gives the OFDM symbol size $T_{1,g}$ (in number of samples) for mode 1 with different guard lengths for DVB-H. Column 11 gives the OFDM symbol size $T_{1,g}$ for mode 1 with different guard lengths for ISDB-T.

TABLE 1

| Parameter | | | DVB-H | | | | ISDB-T | | | |
|---|---|---|---|---|---|---|---|---|---|---|
| Mode | m | | 1 | 2 | 3 | $T_{1,g}$ | 1 | 2 | 3 | $T_{1,g}$ |
| FFT size | $N_m$ | | 2048 | 4096 | 8192 | | 256 | 512 | 1024 | |
| # Carriers | $K_m$ | | 1705 | 3409 | 6817 | | 108 | 216 | 432 | |
| Guard Interval | $L_{m,1}$ | 1/4 | 512 | 1024 | 2048 | 2568 | 64 | 128 | 256 | 320 |
| | $L_{m,2}$ | 1/8 | 256 | 512 | 1024 | 2304 | 32 | 64 | 128 | 288 |
| | $L_{m,3}$ | 1/16 | 128 | 256 | 512 | 2192 | 16 | 32 | 64 | 272 |
| | $L_{m,4}$ | 1/32 | 64 | 128 | 256 | 2112 | 8 | 16 | 32 | 264 |

Figure 3:
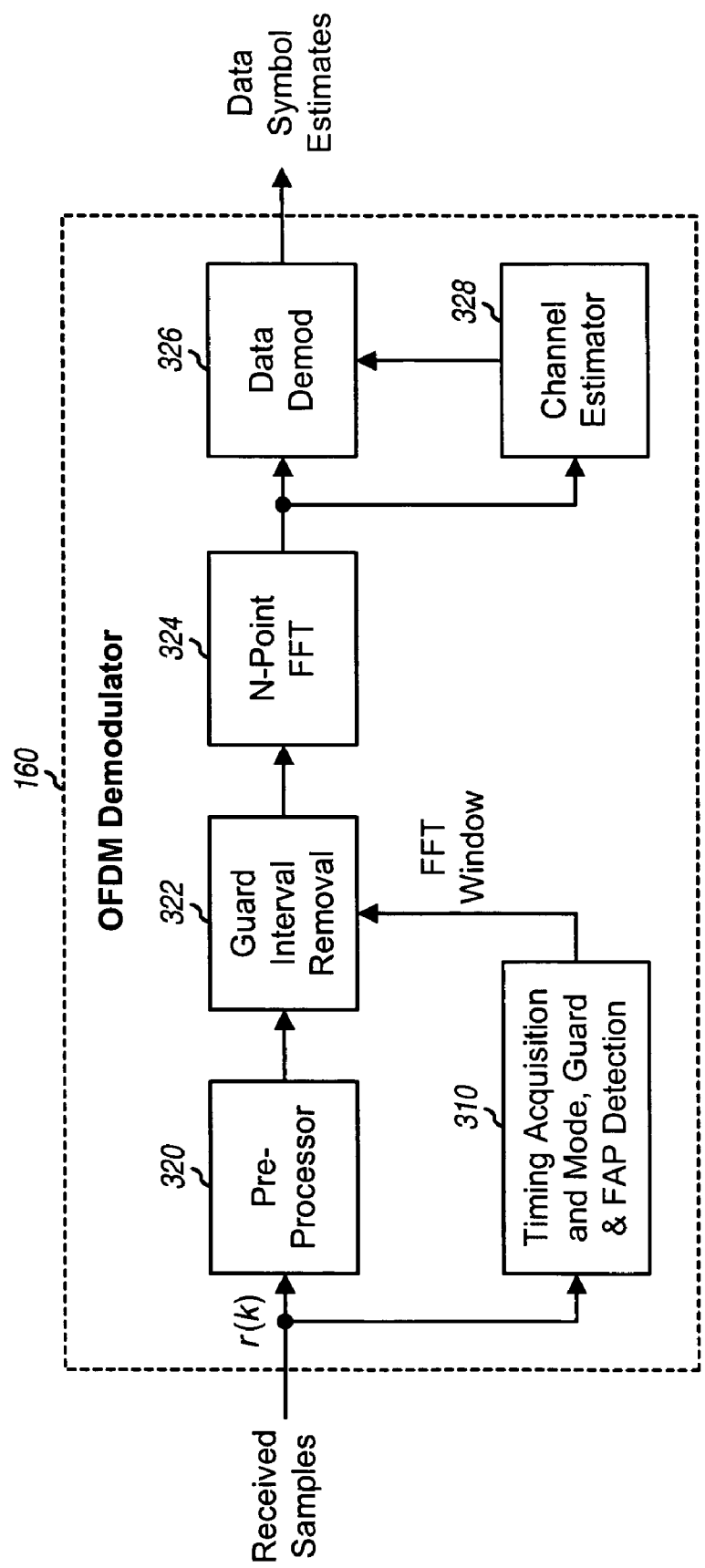
FIG. 3 shows a block diagram of an OFDM demodulator at the receiver.

FIG. 3 shows a block diagram of an embodiment of OFDM demodulator 160 at receiver 150 in FIG. 1. Within OFDM demodulator 160, a timing acquisition and mode, guard and FAP detection unit 310 estimates timing offset and detects mode and guard length based on the received samples from receiver unit 154. Unit 310 also generates the FFT window that determines which samples to process for each received OFDM symbol.

A pre-processor 320 processes the received samples and provides input samples. Pre-processor 320 may perform automatic gain control (AGC), timing acquisition, filtering, sample rate conversion, direct current (DC) offset removal, frequency error estimation and removal, and/or other functions. A unit 322 removes the guard interval in each received OFDM symbol based on the FFT window and provides N input samples for that OFDM symbol. For each received OFDM symbol, an FFT unit 324 performs an N-point FFT on the N input samples and provides N frequency-domain received symbols. A channel estimator 328 derives a channel estimate based on received pilot symbols. The channel estimate may be a time-domain channel impulse response estimate and/or a frequency-domain channel frequency response estimate. A data demodulator 326 performs data demodulation/detection on received data symbols with the channel estimate and provides data symbol estimates. Although not shown in FIG. 3 for simplicity, OFDM demodulator 160 may include other processing units for frame detection, frame synchronization, time tracking, frequency tracking, and/or other functions.

The received signal at the receiver may be expressed as:

$$r(k) = s(k-\tau) \cdot e^{j2\pi \epsilon \cdot k/N} + w(k), \quad \text{Eq (1)}$$

where s(k) is a transmitted chip for sample period k,
r(k) is a received sample for sample period k,
$\tau$ is a timing offset for the received signal,
$\epsilon$ is a frequency error for the received signal, and
w(k) is the noise observed by sample r(k).
For simplicity, the following description assumes that the sample rate for r(k) is equal to the chip rate for s(k). Frequency acquisition to estimate and correct the frequency error $\epsilon$ is not described herein.

As shown in equation (1), the received signal is a delayed version of the transmitted signal. The transmitted signal is composed of a sequence of OFDM symbols. Each OFDM symbol is composed of T=N+L samples, where N and L are determined by the mode and guard length used for the OFDM transmission as well as the system, e.g., DVB-H or ISDB-T. The receiver may not know the system, the mode and the guard length (e.g., upon being powered on) and would need to ascertain these parameters in order to properly process the received signal.

In general, the receiver may evaluate any number of mode and guard hypotheses. Each mode and guard hypothesis corresponds to a specific mode and a specific guard length hypothesized to have been used for the received signal. Hence, hypothesis (m, g) corresponds to a hypothesis that mode m and guard length g are used. For a full search, all 12 hypotheses for 3 modes and 4 guard lengths may be evaluated for DVB-H or ISDB-T. For a partial search, a subset of the hypotheses is evaluated. For a specific search, only one hypothesis (e.g., for the mode and guard length last acquired) is evaluated.

Each OFDM symbol contains a useful part and a guard interval, as shown in FIG. 2. The useful part exhibits properties of a complex Gaussian process due to the N-point IFFT of a large number of random independent data symbols. After inserting the guard interval, the OFDM symbol is not a white process and exhibits cyclo-stationary statistical properties that may be exploited to detect the mode and guard length and to estimate the timing offset $\tau$. In particular, the repeated portion of an OFDM symbol may be correlated with the original portion that is N samples away. Various metrics may be derived based on the correlation results and used to determine the mode, guard length, and timing offset for the received signal.

Correlation may be performed on the received samples for mode m and guard length g as follows:

$$c_m(k) = r(k) \cdot r^*(k - N_m), \text{ and} \quad \text{Eq (2)}$$

$$C_{m,g}(k) = \sum_{i=0}^{L_{m,g}-1} c_m(k - i), \quad \text{Eq (3)}$$

where $c_m(k)$ is the product of r(k) and $r^*(k-N_m)$,
"*" denotes a complex conjugate, and
$C_{m,g}(k)$ is a correlation result for mode m and guard length g in sample period k.

The energy of the guard interval for mode m and guard length g may be computed as follows:

$$e_m(k) = |r(k)|^2 + |r(k - N_m)|^2, \text{ and} \quad \text{Eq (4)}$$

$$E_{m,g}(k) = \sum_{i=0}^{L_g-1} e_m(k - i), \quad \text{Eq (5)}$$

where $e_m(k)$ is the energy of samples r(k) and $r(k-N_m)$, and
$E_{m,g}(k)$ is the guard energy for mode m and guard length g in sample period k.

As shown in equations (2) through (5), $C_{m,g}(k)$ and $E_{m,g}(k)$ are dependent on both mode m and guard length g. Mode m determines which samples to use for computation. Guard length g determines the number of samples to accumulate to obtain $C_{m,g}(k)$ and $E_{m,g}(k)$. For each hypothesis (m, g), a new value may be obtained for $C_{m,g}(k)$ and a new value may be obtained for $E_{m,g}(k)$ in each sample period k.

$C_{m,g}(k)$ and $E_{m,g}(k)$ may be computed in a recursive manner, as follows:

$$C_{m,g}(k) = C_{m,g}(k-1) + c_m(k) - c_m(k-L_{m,g}), \text{ and} \qquad \text{Eq (6)}$$

$$E_{m,g}(k) = E_{m,g}(k-1) + e_m(k) - e_m(k-L_{m,g}). \qquad \text{Eq (7)}$$

As shown in equation (6), $C_{m,g}(k)$ may be computed for each sample period k by adding the new $c_m(k)$ computed for the current sample period k and subtracting out the old $c_m(k-L_{m,g})$ from $L_{m,g}$ sample periods earlier. $E_{m,g}(k)$ may be computed in similar manner as $C_{m,g}(k)$.

In an embodiment, $C_{m,g}(k)$ and $E_{m,g}(k)$ are computed by accumulating over $L_{m,g}$ values for $c_m(k)$ and $e_m(k)$, respectively, as shown in equations (3) and (5). For this embodiment, the number of $c_m(k)$ and $e_m(k)$ values to accumulate, $L_{m,g}$ for each hypothesis (m, g) is dependent on mode m and guard length g.

In another embodiment, which is called guard decimation, $C_{m,g}(k)$ and $E_{m,g}(k)$ are computed based on a fraction of the available samples. For this embodiment, $C_{m,g}(k)$ and $E_{m,g}(k)$ may be obtained by accumulating fewer than $L_{m,g}$ values for $c_m(k)$ and $e_m(k)$, respectively. The $c_m(k)$ and $e_m(k)$ values used for accumulation may be spread across an entire hypothesized guard interval. For example, $C_{m,4}(k)$ for the shortest guard length of 1/32 may be computed by accumulating every $c_m(k)$ values, or $c_m(k)$ through $c_m(k-L_{m,4}-1)$. $C_{m,3}(k)$ for guard length of 1/16 may be computed by accumulating every other $c_m(k)$ values, or $c_m(k), c_m(k-2), \ldots, c_m(k-L_{m,3}-2)$. $C_{m,2}(k)$ for guard length of 1/8 may be computed by accumulating every fourth $c_m(k)$ values, or $c_m(k), c_m(k-4), \ldots, c_m(k-L_{m,2}-4)$. $C_{m,1}(k)$ for the longest guard length of 1/4 may be computed by accumulating every eighth $c_m(k)$ values, or $c_m(k), c_m(k-8), \ldots, c_m(k-L_{m,1}-8)$. $E_{m,g}(k)$ may also be computed with decimation in similar manner as $C_{m,g}(k)$. The decimated computation of $C_{m,g}(k)$ and $E_{m,g}(k)$ may reduce computational requirements for the receiver while providing comparable detection performance for all guard lengths.

$C_{m,g}(k)$ and $E_{m,g}(k)$ for DVB-H may be decimated to match $C_{m,g}(k)$ and $E_{m,g}(k)$ for ISDB-T. As shown in Table 1, the FFT size and guard lengths for mode 1 in DVB-H is 8 times the FFT size and guard lengths for mode 1 in ISDB-T. Hence, $C_{m,g}(k)$ and $E_{m,g}(k)$ may be decimated by a factor of up to 8 for DVB-H for detection performance that is comparable to that for ISDB-T. In general, any decimation factor may be used in the computation of $C_{m,g}(k)$ and $E_{m,g}(k)$.

In an embodiment, which is called piece-wise computation, $C_{m,g}(k)$ and $E_{m,g}(k)$ for different guard lengths for a given mode are computed in a piece-wise manner in order to reduce the amount of computation. As shown in equations (2) through (5), the samples used to compute $C_{m,g}(k)$ and $E_{m,g}(k)$ are determined by mode m whereas the accumulation interval is further determined by guard length g. Hence, $C_{m,g}(k)$ and $E_{m,g}(k)$ may be computed for the shortest guard length of 1/32, and the results for this guard length may be used to compute $C_{m,g}(k)$ and $E_{m,g}(k)$ for longer guard lengths of 1/16, 1/8 and 1/4.

For example, $C_{m,g}(k)$ may be computed for two guard lengths of g1 and g2, where $L_{g1} = 2L_{g2}$, as follows:

$$C_{m,g1}(k) = \sum_{i=0}^{L_{g1}-1} c_m(k-i) \qquad \text{Eq (8)}$$

$$= \sum_{i=0}^{L_{g1}/2-1} c_m(k-i) + \sum_{i=L_{g1}/2}^{L_{g1}-1} c_m(k-i)$$

$$= \sum_{i=0}^{L_{g2}-1} c_m(k-i) + \sum_{i=L_{g2}}^{2L_{g2}-1} c_m(k-i)$$

$$= C_{m,g2}(k) + C_{m,g2}(k-L_{g2}).$$

As shown in equation (8), $C_{m,g1}(k)$ for the longer guard length for sample period k may be computed based on $C_{m,g2}(k)$ for the shorter guard length for sample period k and $C_{m,g2}(k-L_{g2})$ for $L_{m,g2}$ sample periods earlier.

Figure 4:
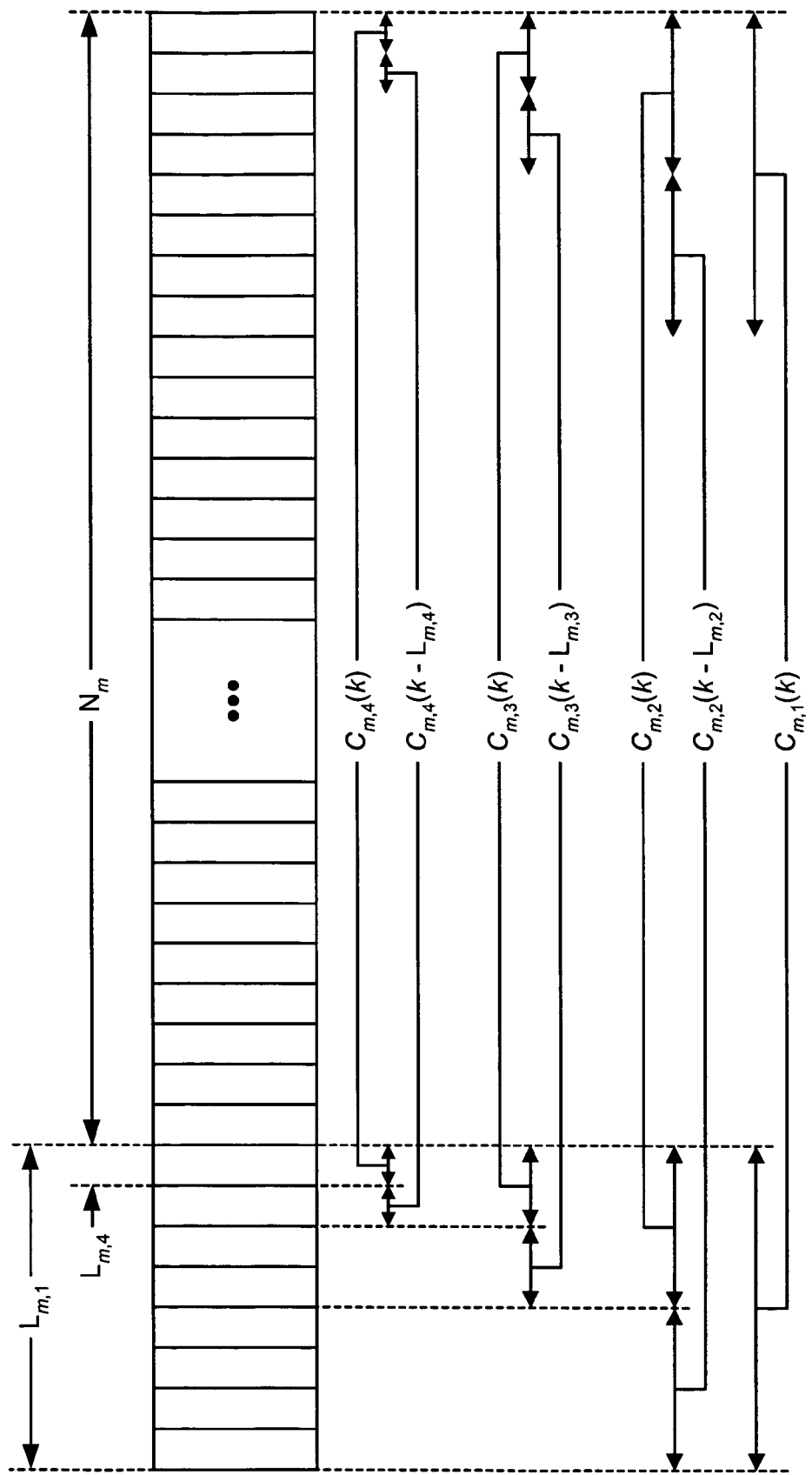
FIG. 4 shows piece-wise computation of correlation for four guard lengths.

FIG. 4 shows an embodiment of piece-wise computation of $C_{m,g}(k)$ for four guard lengths for mode m based on $C_{m,4}(k)$ for the shortest guard length of 1/32. For this embodiment, $C_{m,4}(k)$ is computed for each sample period k based on $c_m(k)$, e.g., as shown in equation (6). $C_{m,3}(k)$ is then computed based on the newly computed $C_{m,4}(k)$ and a stored $C_{m,4}(k-L_{m,4})$. Similarly, $C_{m,2}(k)$ is computed based on the newly computed $C_{m,3}(k)$ and a stored $C_{m,3}(k-L_3)$. Finally, $C_{m,1}(k)$ is computed based on the newly computed $C_{m,2}(k)$ and a stored $C_{m,2}(k-L_{m,2})$. For this embodiment, the receiver may store the last $L_{m,4}$ elements for $C_{m,4}(k)$, the last $L_{m,3}$ elements for $C_{m,3}(k)$, and the last $L_{m,2}$ elements for $C_{m,2}(k)$.

The piece-wise computation may be performed in a memory-efficient manner. All four guard hypotheses may be evaluated in parallel by storing just the last $L_{m,1}$ values of $C_{m,4}$, i.e., a number of smallest guard correlation values equal to the length of the largest guard size. FIG. 4 indicates that all of the components for each of $C_{m,1}$, $C_{m,2}$ and $C_{m,3}$ may be derived in a hierarchical fashion from $C_{m,4}$. Since only summations are performed moving down the hierarchy, only $C_{m,4}$ values may be stored in memory and at each step. Starting from $C_{m,4}$ and moving down the hierarchical ladder, each of the next $C_{m,x}$ values may be obtained with levels of summations.

$C_{m,g}(k)$ may also be computed piece-wise in other manners. $E_{m,g}(k)$ may be computed piece-wise in similar manner as $C_{m,g}(k)$.

Various metrics may be defined based on $C_{m,g}(k)$ and/or $E_{m,g}(k)$. In an embodiment, a metric is defined as follows:

$$M_{m,g}(k') = |C_{m,g}(k)| - \rho \cdot E_{m,g}(k), \qquad \text{Eq (9)}$$

where $\rho$ is a scaling factor, $k' = k \bmod T_{m,g}$ is an index for the metric, and $M_{m,g}(k')$ is a metric element for mode m and guard length g at index k'.

Since the received signal is composed of a sequence of OFDM symbols, metric $M_{m,g}(k')$ is expected to repeat in every OFDM symbol period. Metric $M_{m,g}(k')$ may thus be computed for $T_{m,g}$ time hypotheses with indices of $k'=0, \ldots, T_{m,g}-1$ for mode m and guard length g. These $T_{m,g}$ time hypotheses correspond to $T_{m,g}$ possible locations for the start of a received OFDM symbol.

In an embodiment, the scaling factor p may be defined as follows:

$$\rho = \frac{SNR}{SNR+1}, \qquad \text{Eq (10)}$$

where SNR is a signal-to-noise ratio for the received signal. In other embodiments, $\rho$ may be set to a fixed or configurable value that may be selected to provide good performance. For example, $\rho$ may be set to 0, 1/4, 1/2, 1, or some other value. $\rho$ may be set to a value corresponding to an expected operating SNR for the receiver.

The correlation result $C_{m,g}(k)$ may vary over time due to a fading channel. In equation (9), the guard energy $E_{m,g}(k)$ is subtracted from the correlation result to account for the effects of a fading channel.

Metric $M_{m,g}(k')$ is derived based on samples for one OFDM symbol period. For improved detection performance, metric $M_{m,g}(k')$ may be filtered over multiple OFDM symbol periods. In an embodiment, the filtering is performed by averaging, as follows:

$$\tilde{M}_{m,g}(k', l) = \sum_{i=0}^{N_c-1} M_{m,g}(k', l-i), \quad \text{Eq (11)}$$

where $M_{m,g}(k',l)$ is a metric for symbol period l,
$\tilde{M}_{m,g}(k',l)$ is a filtered metric for symbol period l, and
$N_c$ is the number of symbol periods to average to obtain $\tilde{M}_{m,g}(k',l)$.

$N_c$ may be a fixed value for all modes and guard lengths. For example, $N_c$ may be set to 1, 2, 4, 8, 16, and so on. Alternatively, $N_c$ may be a configurable value that may be dependent on mode m, guard length g, channel and noise conditions, and so on. For example, a larger value of $N_c$ may be used for a short guard interval, and a smaller value of $N_c$ may be used for a long guard interval.

In another embodiment, the filtering is performed with an infinite impulse response (IIR) filter, as follows:

$$\tilde{M}_{m,g}(k',l) = \alpha \cdot \tilde{M}_{m,g}(k',l-1) + (1-\alpha) \cdot \tilde{M}_{m,g}(k',l) \quad \text{Eq (12)}$$

where $\alpha$ is a coefficient that determines the amount of averaging. In general $0 \leq \alpha \leq 1$, with a larger $\alpha$ corresponding to more averaging and vice versa. For clarity, symbol index l is omitted in the following description, and $\tilde{M}_{m,g}(k')$ denotes the filtered metric for the current symbol period.

In an embodiment, $T_{m,g}$ elements are stored for metric $\tilde{M}_{m,g}(k')$, for $k'=0, \ldots, T_{m,g}-1$, for each mode and guard hypothesis. For this embodiment, different numbers of elements are stored for different mode and guard hypotheses.

In another embodiment, which is called time decimation, only a fraction of the $T_{m,g}$ elements for metric $\tilde{M}_{m,g}(k')$ are stored for hypothesis (m, g). The number of possible timing offsets (or time hypotheses) is reduced by storing only a subset of the $T_{m,g}$ elements. Time decimation may be used for modes with larger FFT sizes, e.g., modes 2 and 3. The elements to be stored may be selected from across an entire OFDM symbol. In an embodiment, all $T_{1,g}$ elements are stored for mode 1, $T_{2,g}/2$ elements for every other timing offset are stored for mode 2, and $T_{3,g}/4$ elements for every fourth timing offsets are stored for mode 3. For this embodiment, the same number of elements is stored for all three modes for a given guard length g. For DVB-H, the receiver may store 2568 elements for $\tilde{M}_{m,g}(k')$ for each of the three modes for guard length of ¼, 2304 elements for guard length of ⅛, 2192 elements for guard length of 1/16, and 2112 elements for guard length of 1/32, as shown in Table 1. Time decimation reduces computational and storage requirements for $\tilde{M}_{m,g}(k')$ while providing comparable time resolution, relative to OFDM symbol size, for all modes.

Time decimation may be used for DVB-H to match the time resolution for ISDB-T. As shown in Table 1, the FFT size for mode 1 in DVB-H is 8 times the FFT size for mode 1 in ISDB-T. In an embodiment, time decimation by a factor of 8 is used for each of the three modes in DVB-H. For this embodiment, mode 1 for both DVB-H and ISDB-T have the same time resolution, mode 2 for both systems have twice the time resolution of mode 1, and mode 3 for both systems have four times the time resolution of mode 1. In another embodiment, time decimation is used for DVB-H and ISDB-T such that all modes for both systems have the same time resolution relative to OFDM symbol size. For this embodiment, time decimation by factors of 2 and 4 may be used for modes 2 and 3, respectively, in ISDB-T and time decimation by factors of 8, 16, and 32 may be used for modes 1, 2 and 3, respectively, in DVB-H. In general, any amount of time decimation may be used for any mode and system.

The elements of metric $\tilde{M}_{m,g}(k')$ for each mode and guard hypothesis may be represented by a vector $\underline{\tilde{M}}_{m,g}$. The number of elements in each vector $\underline{\tilde{M}}_{m,g}$ is dependent on mode m, guard length g, and whether time decimation is used.

In an embodiment, metric $\tilde{M}_{m,g}(k')$ is used to detect mode and guard length and to estimate timing offset. For this embodiment, the mode, guard length, and timing offset may be determined as follows:

$$(\hat{m}, \hat{g}, \hat{\tau}) = \arg\left(\max_{m,g,k'} \{\tilde{M}_{m,g}(k')\}\right), \quad \text{Eq (13)}$$

where $\hat{m}$ is the detected mode, $\hat{g}$ is the detected guard length, and $\hat{\tau}$ is the estimated timing offset. In equation (13), the largest element of $\tilde{M}_{m,g}(k')$ for all modes and guard lengths is identified. Indices m, g and k' for this largest element of $\tilde{M}_{m,g}(k')$ are provided as the detected mode $\hat{m}$, the detected guard length $\hat{g}$, and the estimated timing offset $\hat{\tau}$, respectively. The estimated timing offset indicates the start of a received OFDM symbol, as described below.

Metric $\tilde{M}_{m,g}(k')$ can provide a good estimate of timing offset $\tau$. However, metric $\tilde{M}_{m,g}(k')$ may provide unreliable detection of mode and guard length in some operating scenarios. For example, in scenarios with the shortest guard length of 1/32 for modes 2 and 3 in fading channels and low SNRs of less than 5 dB, metric $\tilde{M}_{m,g}(k')$ often declares mode 1. This is because mode 1 has the noisiest statistics of all three modes due to $C_{m,g}(k)$ and $E_{m,g}(k)$ being generated by accumulating over the fewest number of samples, or only 8 samples for ISDB-T and 64 samples for DVB-H.

In another embodiment, mode, guard length, and timing offset are determined in multiple steps. For this embodiment, metric $\tilde{M}_{m,g}(k')$ is an initial metric used to estimate timing offset. The largest element of $\tilde{M}_{m,g}(k')$ for each mode and guard hypothesis is first identified, as follows:

$$\tau_{m,g} = \arg(\max/k'\{\tilde{M}_{m,g}(k')\}), \quad \text{Eq (14)}$$

where $\tau_{m,g}$ is the index for the largest element of $\tilde{M}_{m,g}(k')$ for hypothesis (m, g). $\tau_{m,g}$ is used as the estimated timing offset for hypothesis (m, g).

In an embodiment, an improved metric used for mode and guard length detection may be defined as follows:

$$D_{m,g} = \tilde{M}_{m,g}(\tau_{m,g}) - W_{m,g} \quad \text{Eq (15)}$$

where $W_{m,g}$ is an estimated or average noise for mode m and guard length g, and $D_{m,g}$ is an improved metric used for mode and guard length detection.

In equation (15), metric $D_{m,g}$ for hypothesis (m, g) is obtained by taking the largest element of $\tilde{M}_{m,g}(k')$ and subtracting out the noise $W_{m,g}$. $D_{m,g}$ may be computed for each hypothesis (m, g). $D_{m,g}$ can provide accurate detection of both mode and guard length in various channel environments, including fading channels and low SNRs.

In an embodiment, the noise $W_{m,g}$ may be estimated as follows:

$$W_{m,g} = \frac{1}{N_a \cdot L_{m,g}} \cdot \sum_{i=1}^{N_a} \tilde{M}_{m,g}((\tau_{m,g} - T_{m,g}/2 + i) \bmod T_{m,g}), \quad \text{Eq (16)}$$

where $N_a$ is the number of elements used to estimate the noise. In equation (16), $W_{m,g}$ is obtained by summing $N_a$ elements of $\tilde{M}_{m,g}(k')$ taken from the middle of a received OFDM symbol of length $T_{m,g}$. The middle of the OFDM symbol for hypothesis (m, g) is $T_{m,g}/2$ elements away from the start of the OFDM symbol, which is indicated by $\tau_{m,g}$. The $N_a$ elements are taken in a circular fashion, and index i for the summation wraps around modulo $T_{m,g}$. $N_a$ may be a fixed value (e.g., $N_a$=64) or a configurable value that is dependent on mode m and/or guard length g. For example, $N_a$ may be set to $N_m/4$, $N_m/8$, and soon.

The mode and guard length may be detected based on metric $D_{m,g}$ as follows:

$$(\hat{m}, \hat{g}) = \arg\left(\max_{m,g}\{D_{m,g}\}\right). \quad \text{Eq (17)}$$

In equation (17), the largest element of $D_{m,g}$ for all mode and guard hypotheses is identified. Indices m and g for this largest element of $D_{m,g}$ are then provided as the detected mode $\hat{m}$ and the detected guard length $\hat{g}$, respectively.

The timing offset $\tau$ may then be estimated based on the index k' that yields the largest element of $D_{m,g}$ as follows:

$$\hat{\tau} = \arg\left(\max_{k'}\left\{\tilde{M}_{\hat{m},\hat{g}}(k')\right\}\right). \quad \text{Eq (18)}$$

Instead of doing the search in equation (18), the timing offset $\tau_{m,g}$ for each hypothesis (m, g) may be stored. The timing offset $\tau_{m,g}$ corresponding to the largest element of $D_{m,g}$ may then be provided as the estimated timing offset $\hat{\tau}$.

The estimated timing offset obtained from equation (13) or (18) is for a signal path that yields the largest element of $\tilde{M}_{m,g}(k')$ or $D_{m,g}$, respectively. The receiver may receive multiple copies of the transmitted signal via multiple signal paths. Each signal path has a particular complex gain and a particular delay determined by the propagation environment. It is desirable to place the FFT window such that all or most of the useful energy for all signal paths can be captured and effect of ISI is eliminated or minimized.

In an embodiment, FAP detection is performed after mode and guard detection, and the detected FAP is used to place the FFT window. FAP detection may be performed in various manners. For clarity, a specific embodiment of FAP detection is described below.

For this FAP detection embodiment, a threshold is first computed as follows:

$$TH_{FAP} = \tilde{M}_{\hat{m},\hat{g}}(\hat{\tau}) - D_{\hat{m},\hat{g}}, \quad \text{Eq (19)}$$

where $\tilde{M}_{\hat{m},\hat{g}}(\hat{\tau})$ is the largest element of $\tilde{M}_{m,g}(k')$ for the detected mode and guard length, $D_{\hat{m},\hat{g}}$ is the largest element of $D_{m,g}$ for the detected mode and guard length, G is a gain value, and $TH_{FAP}$ is a threshold used for FAP detection.

Gain G influences the placement of the FFT window, as described below. Gain G may be a fixed value or a programmable value and may be selected to achieve good performance. For example, gain G may be set to ⅞, ½, ¼, ⅛, 1/16, 0, or some other value.

Figure 5A:
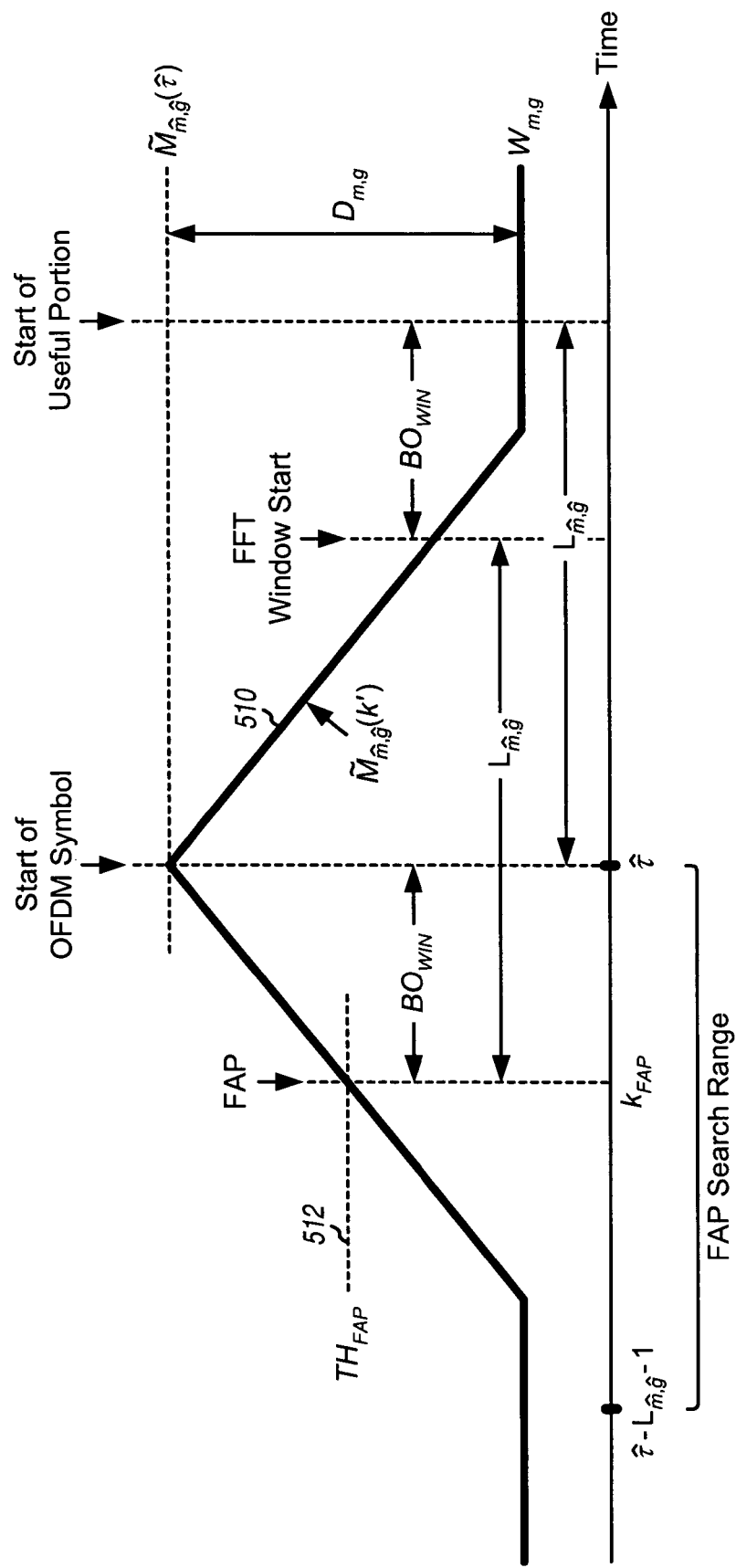
FIGS. 5A and 5B show FAP detection for single path and multipath channels.

FIG. 5A shows FAP detection in accordance with the embodiment described herein. For the example shown in FIG. 5A, the elements of $\tilde{M}_{\hat{m},\hat{g}}(k')$ for the detected mode and guard length are shown by a plot 510, which has a peak at the estimated timing offset $\hat{\tau}$. The estimated noise is indicated by $W_{\hat{m},\hat{g}}$, and the distance between the peak and the noise is indicated by $D_{\hat{m},\hat{g}}$. Threshold $TH_{FAP}$ is computed as shown in equation (19) and is represented by a horizontal line 512.

To detect for the FAP, $L_{\hat{m},\hat{g}}$ elements of $\tilde{M}_{\hat{m},\hat{g}}(k')$ that are immediately to the left of and at the estimated timing offset are identified and are denoted as $\tilde{M}_{\hat{m},\hat{g}}(\hat{\tau}-L_{\hat{m},\hat{g}}+1)$ through $\tilde{M}_{\hat{m},\hat{g}}(\hat{\tau})$. These $L_{\hat{m},\hat{g}}$ elements are obtained in a circular manner since index k' ranges from 0 to $T_{\hat{m},\hat{g}}-1$, so that $\tilde{M}_{\hat{m},\hat{g}}(T_{\hat{m},\hat{g}}-1)$ is the next element selected after $\tilde{M}_{\hat{m},\hat{g}}(0)$. These $L_{\hat{m},\hat{g}}$ elements are earlier in time than the largest element $\tilde{M}_{\hat{m},\hat{g}}(\hat{\tau})$ and represent a search range over which the FAP is detected.

The $L_{\hat{m},\hat{g}}$ elements are compared against threshold $TH_{FAP}$, one element at a time starting with the earliest element $\tilde{M}_{\hat{m},\hat{g}}(\hat{\tau}-L_{\hat{m},\hat{g}}+1)$ and moving toward $\tilde{M}_{\hat{m},\hat{g}}(\hat{\tau})$ The first element that exceeds the threshold is declared as the element for the FAP, and the index for this element is denoted as $k_{FAP}$. The distance between index $k_{FAP}$ and the estimated timing offset $\hat{\tau}$ is determined and referred to as an FFT window backoff $BO_{WIN}$, or $BO_{WIN} = \hat{\tau} - k_{FAP}$. The window backoff has a smallest value of 0 if only one element, which is $\tilde{M}_{\hat{m},\hat{g}}(\hat{\tau})$, exceeds the threshold. The window backoff has a largest value of $L_{\hat{g}}-1$ if the earliest selected element, which is $\tilde{M}_{\hat{m},\hat{g}}(\hat{\tau}-L_{\hat{m},\hat{g}}+1)$, exceeds the threshold.

The start of the FFT window may then be computed as:

$$FFT \text{ Window Start} = k_{FAP} + L_{\hat{m},\hat{g}}. \quad \text{Eq (20)}$$

As shown in equation (20) and FIG. 5A, the FFT window is placed starting at one guard interval to the right of the detected FAP.

FIG. 5A shows a case with a single signal path. In the absence of noise, a peak value is obtained for $\tilde{M}_{m,g}(k')$ when the entire guard interval is correlated with its original copy, which occurs when index k' corresponds to the start/end of a received OFDM symbol. $\hat{\tau}$ is thus an estimate of the start of the received OFDM symbol. The value for $\tilde{M}_{m,g}(k')$ decreases monotonically for k' indices that are progressively further away from $\hat{\tau}$, since a progressively smaller portion of the guard interval is being correlated.

If there is only one signal path located at $\hat{\tau}$ and in the absence of noise, then $\tilde{M}_{m,g}(k')$ has a peak value at $\hat{\tau}$ and decreases monotonically from both sides of $\hat{\tau}$ until the smallest value is reached at approximately $\hat{\tau}-L_{\hat{m},\hat{g}}$ and $\hat{\tau}+L_{\hat{m},\hat{g}}$, which are $L_{\hat{m},\hat{g}}$ sample periods away from the peak location, as indicated in FIG. 5A. $D_{\hat{m},\hat{g}}$ is the distance between the peak value and the average noise and is related to $L_{\hat{m},\hat{g}}$.

Gain G determines threshold $TH_{FAP}$, which affects the detection of the FAP and the placement of the FFT window. For example, if G=¼, then the threshold is set at $D_{\hat{m},\hat{g}}/4$ below the peak value, the FAP will be detected at approximately $\hat{\tau}-L_{\hat{m},\hat{g}}/4$ for the waveform shown in FIG. 5A, and the FFT window will be placed starting at $\hat{\tau}+3L_{\hat{m},\hat{g}}/4$, which is $L_{\hat{m},\hat{g}}/4$ from the start of the useful portion. A gain of G=x thus results in the FFT window being placed at $x \cdot L_{\hat{m},\hat{g}}$ from the start of the useful portion. Gain G may thus be considered as a "fraction of the guard" backoff parameter.

If there is only one signal path located at $\hat{\tau}$, then the FFT window may be placed anywhere within the range of $\hat{\tau}$ to $\hat{\tau}+L_{\hat{m},\hat{g}}-1$, and all of the useful energy for this signal path can be captured by the FFT window and no ISI results. However, there may be multiple signal paths. Furthermore, noise may cause random fluctuations in the computed values for $\tilde{M}_{m,g}(k')$. The FAP detection and FFT window placement may be performed such that multipath as well as uncertainty in $\tilde{M}_{m,g}(k')$ due to noise can be accounted for.

Figure 5B:
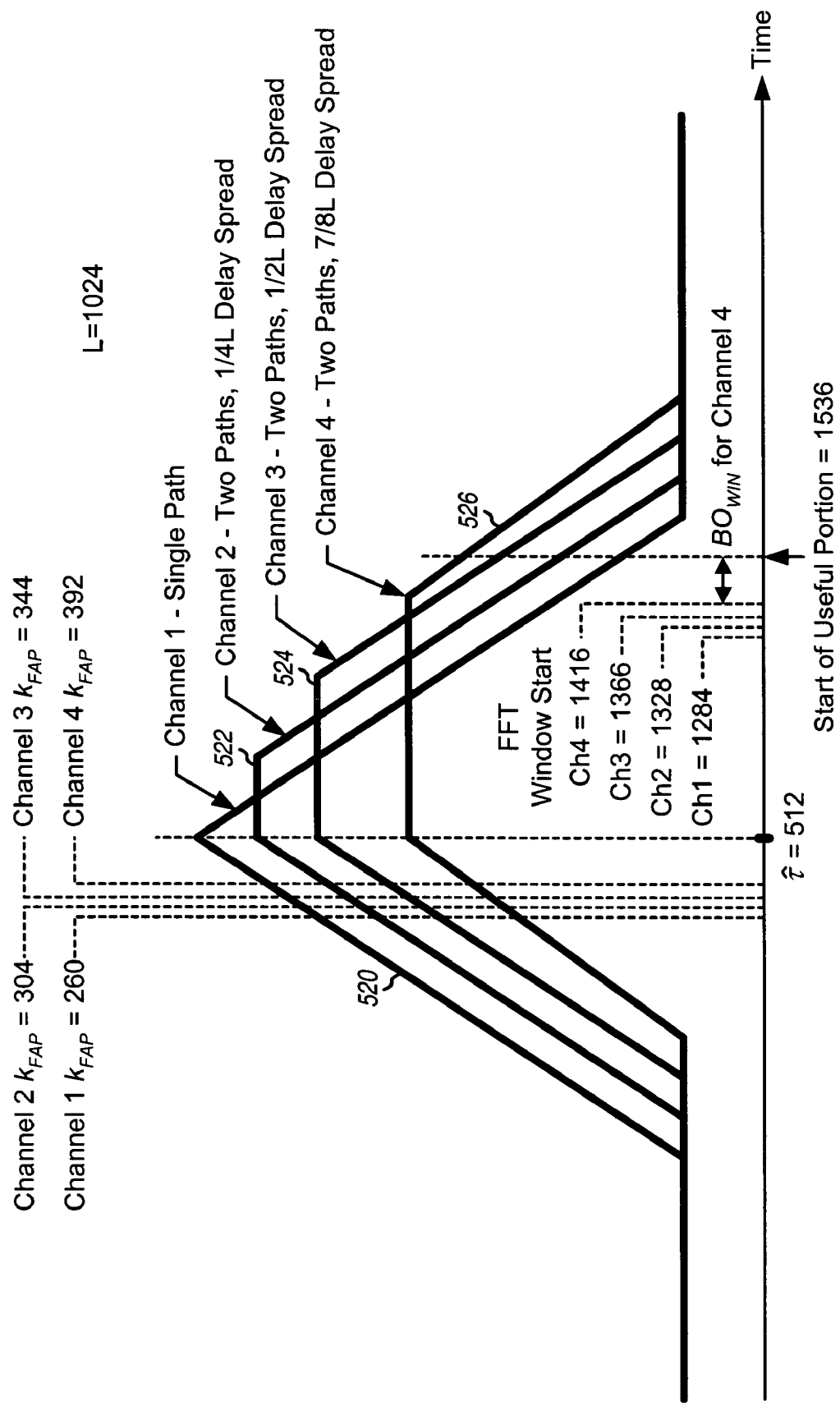

FIG. 5B shows FAP detection and FFT window placement for a single path channel and three different multipath channels. For the example shown in FIG. 5B, the guard length is L=1024 samples. A plot 520 shows $\tilde{M}_{\hat{m},\hat{g}}(k')$ for the single path channel and has a peak at the estimated timing offset $\hat{\tau}$, which is at index k'=512. A plot 522 shows $\tilde{M}_{\hat{m},\hat{g}}(k')$ for a two-path channel with delay spread of L/4 or 256 samples. Plot 522 has a plateau from $\hat{\tau}$ to $\hat{\tau}+255$. A plot 524 shows $\tilde{M}_{\hat{m},\hat{g}}(k')$ for a two-path channel with delay spread of L/2 or 512 samples. Plot 524 has a plateau from $\hat{\tau}$ to $\hat{\tau}+511$. A plot 526 shows $\tilde{M}_{\hat{m},\hat{g}}(k')$ for a two-path channel with delay spread of 7L/8 or 896 samples. Plot 526 has a plateau from $\hat{\tau}$ to $\hat{\tau}+895$.

In general, in the presence of multipath, the guard correlation shown in equations (2) and (3) produces a flat region with a size corresponding to the delay spread of the channel. In the presence of noise, any point within the flat region may be detected as the peak. Hence, placing the FFT window based solely on the detected peak may not be optimal for some channels and may result in degraded performance. FAP detection and window backoff may be used to account for inaccuracies in the estimated timing offset as well as different channel profile lengths, as described below.

For the example shown in FIG. 5B, G is set at ¼, and the target window backoff is approximately ¼ of the guard interval. For the single path channel, the threshold is computed as described above, the FAP is detected at $k_{FAP}$=260, and the FFT window starts at 260+1024=1284. For the two-path channel with delay spread of L/4, the threshold is lower because of the lower peak value, the FAP is detected at $k_{FAP}$=304, and the FFT window starts at 304+1024=1328. For the two-path channel with delay spread of L/2, the FAP is detected at $k_{FAP}$=344, and the FFT window starts at 344+1024=1368. For the two-path channel with delay spread of 7L/8, the FAP is detected at $k_{FAP}$=392, and the FFT window starts at 392+1024=1416. As illustrated by this example, the FFT window is placed closer to the useful part for longer channel profile with longer delay spread. The window backoff, which is the distance between the start of the FFT window and the start of the useful portion, shrinks for longer channel delay, as shown in FIG. 5B. This dynamic scaling of the window backoff with the length of the channel profile is highly desirable and allows more of the useful energy to be captured while providing suitable safety margin for the FFT window placement.

Figure 6:
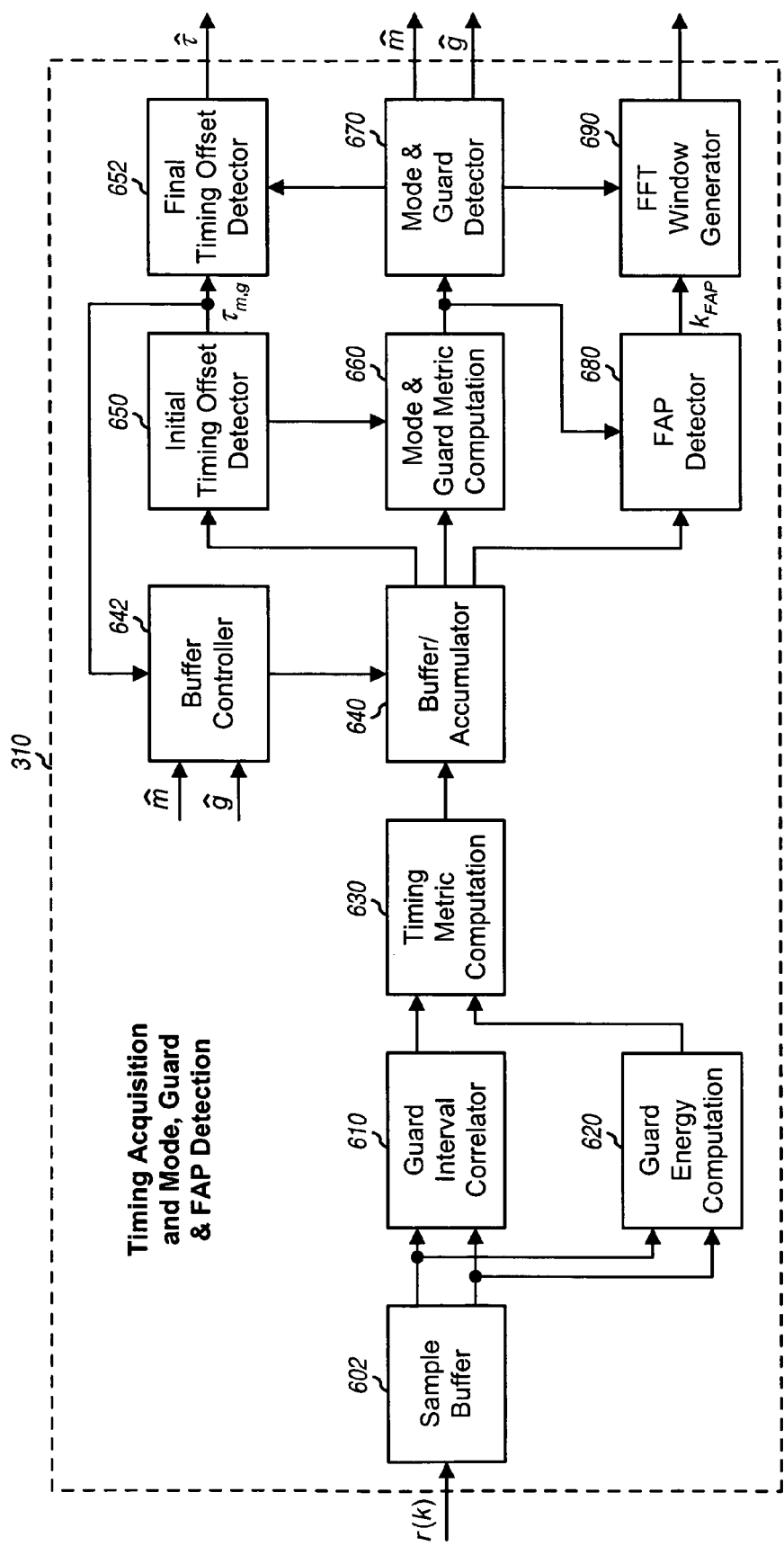
FIG. 6 shows a block diagram of a timing acquisition and mode, guard and FAP detection unit.

FIG. 6 shows a block diagram of an embodiment of timing acquisition and mode, guard and FAP detection unit 310 within OFDM demodulator 160 in FIG. 3. Within unit 310, a sample buffer 602 receives samples r(k) from receiver unit 154 and stores these samples for subsequent processing.

A guard interval correlator 610 performs correlation on the samples, e.g., as shown in equations (2) and (3) or equation (6), and provides correlation results $C_{m,g}(k)$ for all mode and guard hypotheses being evaluated. A guard energy computation unit 620 computes the energy of the guard interval and its original portion, e.g., as shown in equations (4) and (5) or equation (7), and provides guard energies $E_{m,g}(k)$ for all mode and guard hypotheses. Units 610 and 620 may perform correlation and energy computation for different guard lengths of a given mode in a piece-wise manner, as shown in equation (8) and FIG. 4. A unit 630 computes metric $\tilde{M}_{m,g}(k')$ for all mode and guard hypotheses based on the correlation results $C_{m,g}(k)$ and the guard energies $E_{m,g}(k)$, e.g., as shown in equation (9). A buffer/accumulator 640 performs filtering for metric $M_{m,g}(k')$, e.g., non-coherent accumulation shown in equation (11) or IIR filtering shown in equation (12), and obtains filtered metric $\tilde{M}_{m,g}(k')$ for all mode and guard hypotheses. Buffer 640 stores the elements of $\tilde{M}_{m,g}(k')$ and provides the appropriate elements as directed by a buffer controller 642.

An initial timing offset detector 650 estimates the timing offset for each mode and guard hypothesis, e.g., by identifying the largest element of $\tilde{M}_{m,g}(k')$ as shown in equation (14). Detector 650 provides the estimated timing offset $\tau_{m,g}$ as well as the largest element $\tilde{M}_{m,g}(\tau_{m,g})$ for each mode and guard hypothesis.

A unit 660 computes metric $D_{m,g}$ for each mode and guard hypothesis based on the largest element $\tilde{M}_{m,g}(\tau_{m,g})$ from detector 650 and the estimated noise $W_{m,g}$, e.g., as shown in equation (15). Unit 660 may estimate the noise $W_{m,g}$ for each mode and guard hypothesis based on a set of elements for $\tilde{M}_{m,g}(k')$ at locations determined by the estimated timing offset $\tau_{m,g}$ for that hypothesis, e.g., as shown in equation (16). A detector 670 detects the mode and guard length based on metric $D_{m,g}$, e.g., as shown in equation (17), and provides the detected mode $\hat{m}$ and the detected guard length $\hat{g}$. A final timing offset detector 652 receives the timing offsets $\tau_{m,g}$ for all mode and guard hypotheses and provides the timing offset for the selected mode and guard hypothesis as the estimated timing offset $\hat{\tau}$ for the received OFDM transmission.

An FAP detector 680 performs FAP detection. Detector 680 may compute threshold $TH_{FAP}$, e.g., as shown in equation (19). Detector 680 may then detect for the FAP based on the threshold and the elements of $\tilde{M}_{\hat{m},\hat{g}}(k')$ for the detected mode and guard length, e.g., as described above for FIG. 5A. Detector 680 provides index $k_{FAP}$ for the detected FAP. An FFT window generator 690 generates the FFT window based on the index $k_{FAP}$ from detector 680 and the detected mode and guard length from detector 670. Generator 690 may compute the start of the FFT window, e.g., as shown in equation (20) and may compute the size of the FFT window based on the detected mode $\hat{m}$.

Buffer controller 642 generates addresses for buffer 640 (1) to accumulate, average, or filter $M_{m,g}(k)$ from unit 630 at the proper location in buffer 640 and (2) to retrieve the proper elements of $\tilde{M}_{m,g}(k')$ from buffer 640. For timing offset estimation, buffer 640 provides to detector 650 all elements of $\tilde{M}_{m,g}(k')$ for all mode and guard hypotheses. For mode and guard detection, buffer 640 provides to unit 660 the elements of $\tilde{M}_{m,g}(k')$ within the noise measurement window for each mode and guard hypothesis, as determined by the estimated timing offset $\tau_{m,g}$ for that hypothesis. For FAP detection, buffer 640 provides to FAP detector 680 the elements of $\tilde{M}_{\hat{m},\hat{g}}(k')$ for the detected mode and guard length within the search window.

Figure 7:
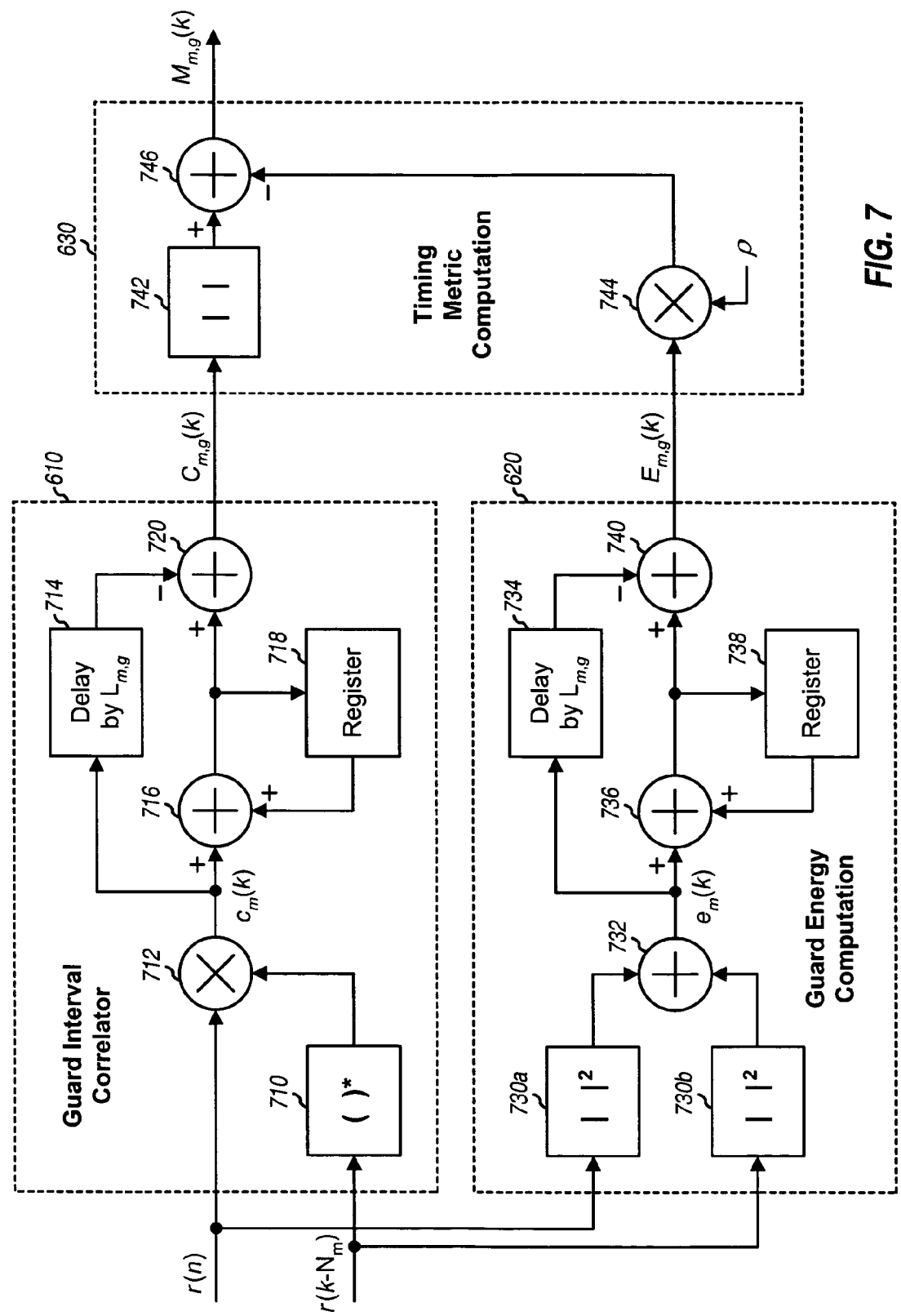
FIG. 7 shows a block diagram of a guard interval correlator, a guard energy computation unit, and a metric computation unit.

FIG. 7 shows a block diagram of an embodiment of guard interval correlator 610, guard energy computation unit 620, and metric computation unit 630 in FIG. 6. Within correlator 610, a unit 710 receives and conjugates sample $r(k-N_m)$. A multiplier 712 multiplies sample r(k) with conjugated sample $r^*(k-N_m)$ and provides an output $c_m(k)$ to a delay unit 714 and a summer 716. Delay unit 714 provides a delay of $L_{m,g}$ sample periods and outputs $c(k-L_{m,g})$. Delay unit 714 may be implemented with shift registers that may be initialized to zero. Summer 716 sums $c_m(k)$ with the output of a register 718 and provides its output to register 718 and a summer 720. Summer 716 and register 718 form an accumulator that accumulates all $c_m(k)$ outputs from multiplier 712. Summer 720 subtracts $c(k-L_{m,g})$ from the output of summer 716 and provides correlation result $C_{m,g}(k)$. In each sample period k, $c_m(k)$ is accumulated by summer 716, and $c(k-L_{m,g})$ is subtracted by summer 720. Units 714 through 720 collectively perform sliding correlation for the guard interval.

Within computation unit 620, a unit 730a computes the squared magnitude of sample r(k), and a unit 730b computes the squared magnitude of sample $r(k-N_m)$. A summer 732 sums the outputs of units 730a and 730b and provides an output $e_m(k)$ to a delay unit 734 and a summer 736. Delay unit 734 provides a delay of $L_{m,g}$ sample periods and outputs $e(k-L_{m,g})$. Summer 736 sums $e_m(k)$ with the output of a register 738 and provides its output to register 738 and a summer 740. Summer 736 and register 738 form an accumulator that accumulates all $e_m(k)$ outputs from summer 732. Summer 740 subtracts $e(k-L_{m,g})$ from the output of summer 736 and provides the guard energy $E_{m,g}(k)$. In each sample period k, $e_m(k)$ is accumulated by summer 736, and $e(k-L_{m,g})$ is subtracted by summer 740. Units 734 through 740 collectively perform sliding energy computation for the guard interval.

Within computation unit 630, a unit 742 determines the magnitude of $C_{m,g}(k)$ from correlator 610. A multiplier 744 multiplies $E_{m,g}(k)$ from unit 620 with the scaling factor ρ. A summer 746 subtracts the output of multiplier 744 from the output of unit 742 and provides metric $M_{m,g}(k)$.

For guard decimation, the received samples r(k) may be downsampled by a decimation factor of D (e.g., by taking every D sample in a sample buffer) to obtain decimated samples $r_{dec}(k)$, where $r_{dec}(k)=r(D\cdot k)$. All of the computations described above, including recursion, may then be performed on the decimated samples.

For time decimation, the units in guard interval correlator 610 and guard energy computation unit 620 may be operated at the sample rate because of the recursive computation of $C_{m,g}(k)$ and $E_{m,g}(k)$. However, metric computation unit 630 may be operated at a fraction of the sample rate.

In an embodiment, time decimation is used for modes 2 and 3 in ISDB-T to match the time resolution, relative to OFDM symbol size, for mode 1. In an embodiment, both guard decimation and time decimation are used for all three modes in DVB-H. Guard and time decimation may also be applied in other manners for the various modes in the two systems.

FIGS. 6 and 7 show specific embodiments of timing acquisition and mode, guard and FAP detection unit 310. Any number of mode and guard hypotheses may be evaluated to determine the mode and guard length used for a received OFDM transmission. The hypotheses may be evaluated sequentially (e.g., by time division multiplexing the hardware and possibly operating the hardware at a higher clock speed) and/or in parallel (e.g., by replicating some or all of the hardware).

Figure 8:
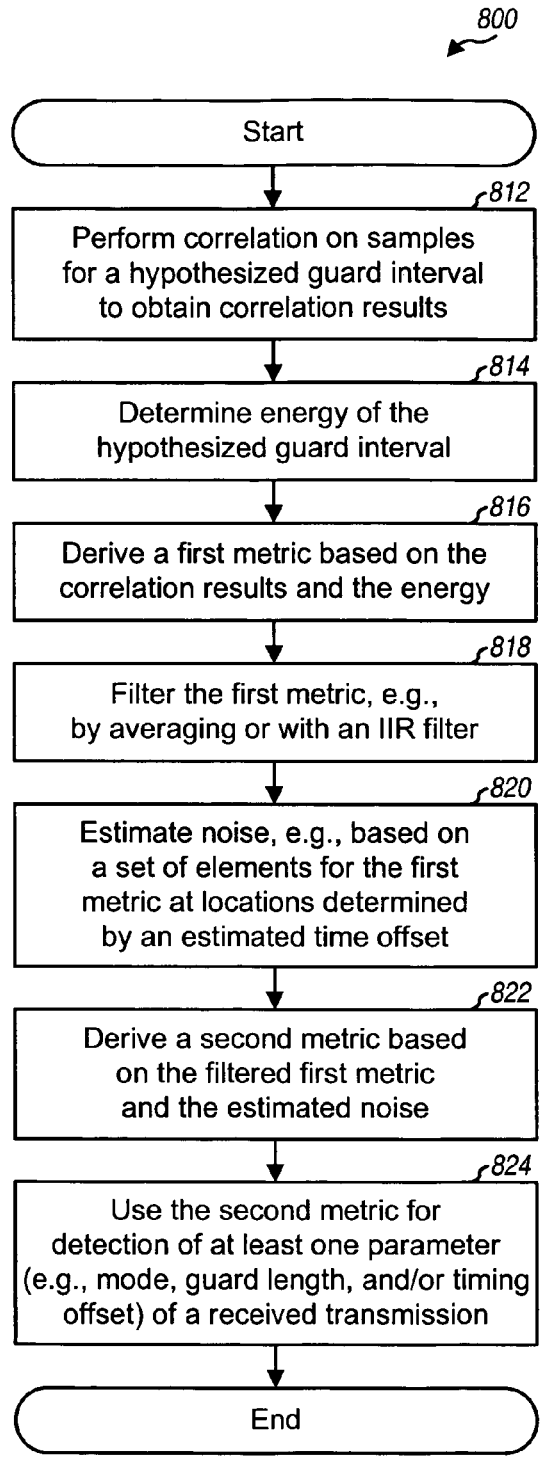
FIG. 8 shows a process to derive a metric used for mode and guard detection.

FIG. 8 shows an embodiment of a process 800 for deriving metric(s) used for mode and guard detection, timing offset estimation, and/or other purposes. Process 800 may be performed for each mode and guard hypothesis to be evaluated. For process 800, correlation is performed on samples for a hypothesized guard interval to obtain correlation results (block 812). The energy of the hypothesized guard interval is also determined (block 814). A first/initial metric is derived based on the correlation results and the energy, e.g., as shown in equation (9) (block 816). The first metric may be filtered, e.g., by averaging as shown in equation (11) or with an IIR filter as shown in equation (12) (block 818). Noise is estimated, e.g., based on a set of elements for the first metric at locations determined by an estimated timing offset, as shown in equation (16) (block 820). A second/improved metric is then derived based on the filtered first metric and the estimated noise, e.g., as shown in equation (15) (block 822). The second metric is used for detection of at least one parameter (e.g., mode, guard length, timing offset, and so on) of a received transmission (block 824).

The metrics may also be derived in other manners. For example, the energy of the hypothesized guard interval may be omitted. As another example, the filtering may be omitted. The metrics may also incorporate additional information not described above for FIG. 8.

Figure 9:
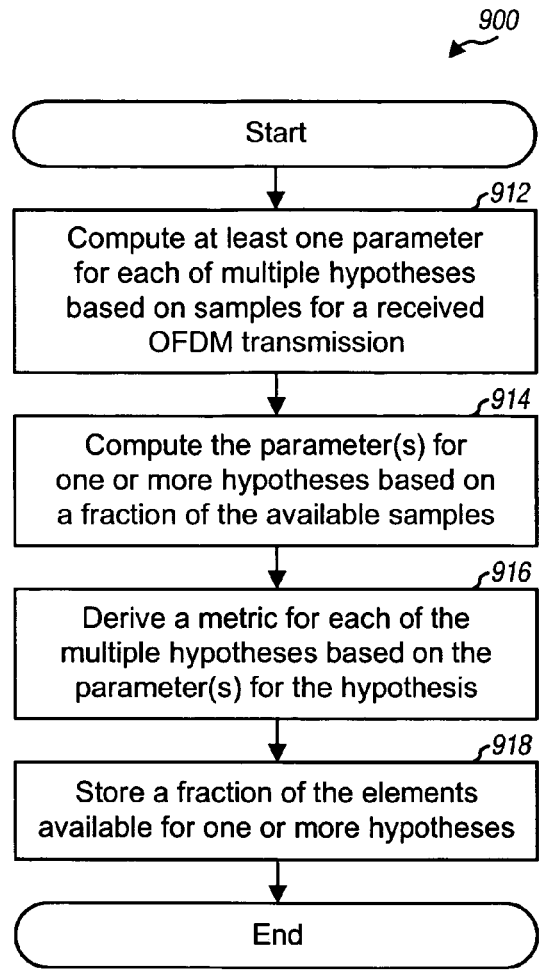
FIG. 9 shows a process to derive a metric with decimation.

FIG. 9 shows an embodiment of a process 900 to compute a metric with decimation. At least one parameter is computed for each of multiple hypotheses based on samples for a received OFDM transmission (block 912). The parameter(s) may comprise $C_{m,g}(k)$, $E_{m,g}(k)$, and/or some other parameter. For a given hypothesis, the parameter(s) may be computed based on a fraction of the available samples (block 914). For guard decimation, correlation and energy computation may be performed using a fraction of the samples available for a given hypothesis. The samples used for correlation and energy computation may be taken from across a hypothesized guard interval. Correlation and energy computation may also be performed for equal number of samples for all hypotheses being evaluated.

A metric is derived for each of the multiple hypotheses based on the parameter(s) for the hypothesis (block 916). The metric may be $M_{m,g}(k')$ or some other metric. For a given hypothesis, a fraction of the elements available for the metric may be computed and stored for the hypothesis (block 918). For time decimation, the metric may be derived for a fraction of the timing offsets possible for a given hypothesis. The metric may also be derived to achieve the same time resolution, relative to OFDM symbol size, for all hypotheses being evaluated.

Figure 10:
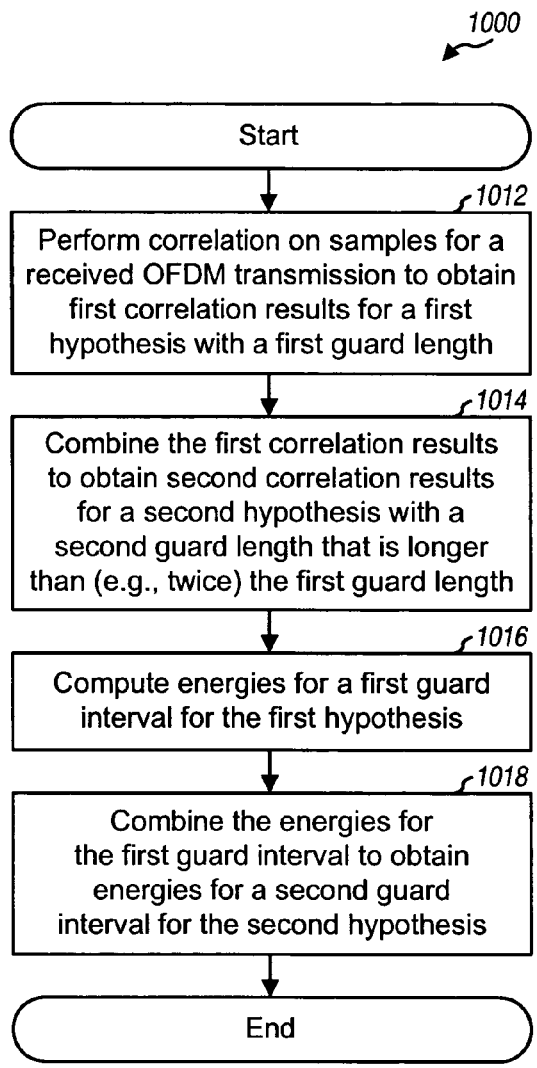
FIG. 10 shows a process to compute parameters in a piecewise manner.

FIG. 10 shows an embodiment of a process 1000 for computing parameters in a piece-wise manner for multiple hypotheses. For process 1000, correlation is performed on samples for a received OFDM transmission to obtain first correlation results for a first hypothesis with a first guard length (block 1012). The first correlation results are combined to obtain second correlation results for a second hypothesis with a second guard length that is longer than (e.g., twice) the first guard length (block 1014). Correlation results for even longer guard lengths may be obtained by combining correlation results for shorter guard lengths. Energies for a first guard interval for the first hypothesis are computed (block 1016). The energies for the first guard interval are combined to obtain energies for a second guard interval for the second hypothesis (block 1018). Energies for even longer guard intervals may be obtained by combining energies for shorter guard intervals.

Figure 11:
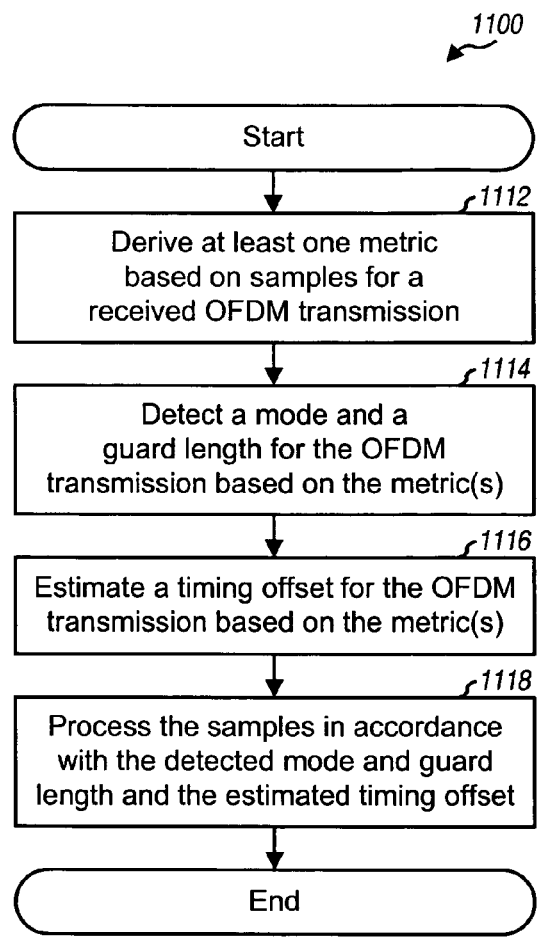
FIG. 11 shows a process to detect mode and guard length.

FIG. 11 shows an embodiment of a process 1100 for detecting mode and guard length for a received OFDM transmission. At least one metric is derived based on samples for the OFDM transmission (block 1112). The metric(s) may be any one or any combination of the metrics described above (e.g., $M_{m,g}(k')$, $\tilde{M}_{m,g}(k')$ and $D_{m,g}$) and/or some other metric. The metric(s) may be derived for multiple mode and guard hypotheses.

The mode and guard length for the OFDM transmission are then detected based on the metric(s) (block 1114). The most likely hypothesis may be identified based on the metric(s), and the mode and guard length for this hypothesis may be provided as the detected mode and guard length for the OFDM transmission. A timing offset for the OFDM transmission may be estimated based on the metric(s) (block 1116). The mode and guard detection and the timing offset estimation may be performed in one or multiple steps based on the metric(s). For example, the timing offset for each hypothesis may be determined, the mode and guard length may be detected using the timing offsets for the hypotheses, and the timing offset for the OFDM transmission may be estimated after the mode and guard detection, as described above. The samples are then processed in accordance with the detected mode and guard length and the estimated timing offset (block 1118).

FIG. 12 shows an embodiment of a process 1200 for performing timing acquisition and mode and guard detection for a received OFDM transmission. A first/initial metric (e.g., $M_{m,g}(k')$) is derived for each of multiple mode and guard hypotheses based on samples for the OFDM transmission (block 1212). A timing offset is estimated for each hypothesis based on the first metric for the hypothesis (block 1214). A second/improved metric (e.g., $D_{m,g}$) is derived for each hypothesis based on the first metric and the estimated timing offset for the hypothesis (block 1216). The first metric and timing offset for each hypothesis may be used to estimate the noise for the hypothesis, which may in turn be used to derive the second metric for the hypothesis. The mode and guard length for the OFDM transmission are detected based on the second metric (block 1218). The timing offset for the OFDM transmission is then estimated based on the first or second metric and the detected mode and guard length (block 1220).

FIG. 13 shows an embodiment of a process 1300 for performing FAP detection and FFT window placement. An FAP is detected based on at least one metric used to detect the mode and guard length for a received OFDM transmission (block 1312). The metric(s) may be any one or any combination of the metrics described above and/or some other metric. For example, elements may be derived for metric $M_{m,g}(k')$ for different possible timing offsets for the OFDM transmission, the largest element of $M_{m,g}(k')$ may be identified, a threshold may be determined based on the largest element and the estimated noise, multiple elements that are earlier than the largest element may be selected, the element that exceeds the threshold and is earliest among the selected elements may be identified, and the FAP may be detected based on the identified element. The threshold may also be determined based on a gain that is indicative of a target position for the FFT window.

The FFT window is then determined based on the detected FAP, mode and guard length (block 1314). The FFT window has a width determined by the detected mode and is placed at a location determined by the detect FAP and guard length, e.g., one guard interval later than the detect FAP. Samples are selected for processing based on the FFT window (block 1316).

The acquisition techniques described herein may be implemented by various means. For example, these techniques may be implemented in hardware, firmware, software, or a combination thereof. For a hardware implementation, the processing units used to estimate timing offset, detect mode and guard length, detect for FAP, and generate FFT window may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 182 in FIG. 1) and executed by a processor (e.g., processor 180). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
    at least one processor configured to:
        perform correlation for a hypothesized guard interval in a transmission received from a transmitter to obtain correlation results for the transmission, to estimate noise, to derive a metric by combining the correlation results and the estimated noise, and to use the metric for detection of at least one parameter for the transmission; and
        determine energy for the hypothesized guard interval, to derive a first metric based on the correlation results and the energy, to filter the first metric, to estimate the noise based on a set of elements for the filtered first metric, and to derive the metric based on the filtered first metric and the estimated noise; and
    a memory coupled to the at least one processor;
    wherein an actual length of a guard interval used by the transmitter for the transmission is unknown at said apparatus.

2. The apparatus of claim 1, wherein the at least one processor is configured to determine energy for the hypothesized guard interval and to derive the metric further based on the energy.

3. A method comprising:
    performing correlation for a hypothesized guard interval in a transmission received from a transmitter to obtain correlation results for the transmission;
    estimating noise;
    deriving a metric by combining the correlation results and the estimated noise; and
    using the metric for detection of at least one parameter for the transmission;
    determining energy for the hypothesized guard interval to derive a first metric based on the correlation results and the energy;
    filtering the first metric to estimate the noise based on a set of elements for the filtered first metric; and
    deriving the metric based on the filtered first metric and the estimated noise;
    wherein an actual length of a guard interval used by the transmitter for the transmission is unknown during performance of said method.

4. The method of claim 3, further comprising:
    determining energy for the hypothesized guard interval, and wherein the deriving the metric comprises deriving the metric based on the correlation results, the energy, and the estimated noise.

5. An apparatus comprising:
means for performing correlation for a hypothesized guard interval in a transmission received from a transmitter to obtain correlation results for the transmission;
means for estimating noise;
means for deriving a metric by combining the correlation results and the estimated noise; and
means for using the metric for detection of at least one parameter for the transmission;
means for determining energy for the hypothesized guard interval to derive a first metric based on the correlation results and the energy;
means for filtering the first metric to estimate the noise based on a set of elements for the filtered first metric; and
means for deriving the metric based on the filtered first metric and the estimated noise;
wherein an actual length of a guard interval used by the transmitter for the transmission is unknown at said apparatus.

6. The apparatus of claim 5, further comprising:
means for determining energy for the hypothesized guard interval, and wherein the means for deriving the metric comprises means for deriving the metric based on the correlation results, the energy, and the estimated noise.

7. A non-transitory processor readable media for storing instructions operable on a processor to:
perform correlation for a hypothesized guard interval in a transmission received from a transmitter to obtain correlation results for the transmission;
estimate noise;
derive a metric based on by combining the correlation results and the estimated noise; and
use the metric for detection of at least one parameter for the transmission; and
determine energy for the hypothesized guard interval to derive a first metric based on the correlation results and the energy;
filter the first metric to estimate the noise based on a set of elements for the filtered first metric; and
further derive the metric based on the filtered first metric and the estimated noise;
wherein an actual length of a guard interval used by the transmitter for the transmission is unknown to the processor.

8. The processor readable media of claim 7, and further for storing instructions operable to:
determine energy for the hypothesized guard interval, and wherein the deriving the metric comprises deriving derive the metric based on the correlation results, the energy, and the estimated noise.

9. An apparatus comprising:
at least one processor configured to derive at least one metric by combining at least one of noise information and energy information associated with an OFDM transmission with correlation results associated with samples of the OFDM transmission, to detect a mode and a guard length for the OFDM transmission based on the at least one metric, and to process the samples in accordance with the detected mode and guard length, wherein the mode indicates the duration of a useful portion of each OFDM symbol in the OFDM transmission and the guard length indicates the duration of a guard interval for each OFDM symbol, wherein an actual mode and an actual guard length used by the transmitter for the OFDM transmission are unknown to said apparatus prior to said detection, and wherein the OFDM transmission is received from a transmitter via a communication channel; and
a memory coupled to the at least one processor;
wherein the at least one processor is further configured to:
determine energy for at least one hypothesis corresponding to a different combination of mode and guard length hypothesized for the OFDM transmission to derive a first metric based on the correlation results and the energy;
filter the first metric to estimate the noise based on a set of elements for the filtered first metric; and
derive the at least one metric based on the filtered first metric and the estimated noise.

10. The apparatus of claim 9, wherein the at least one processor is configured to derive the at least one metric for multiple hypotheses, each hypothesis corresponding to a different combination of mode and guard length hypothesized for the OFDM transmission, to identify a most likely hypothesis based on the at least one metric, and to provide the mode and guard length for the identified hypothesis as the detected mode and guard length for the OFDM transmission.

11. The apparatus of claim 10, wherein for each of the multiple hypotheses the at least one processor is configured to perform correlation for a guard interval for the hypothesis to obtain correlation results for the hypothesis, to estimate noise for the hypothesis, and to derive the at least one metric for the hypothesis based on the correlation results and the estimated noise for the hypothesis.

12. The apparatus of claim 11, wherein for each of the multiple hypotheses the at least one processor is configured to determine energy of the guard interval for the hypothesis and to derive the at least one metric for the hypothesis further based on the energy.

13. The apparatus of claim 9, wherein the at least one processor is configured to estimate a timing offset for the OFDM transmission based on the at least one metric, and to process the samples further based on the estimated timing offset.

14. A method comprising:
deriving at least one metric by combining at least one of noise information and energy information associated with an OFDM transmission with correlation results associated with samples of the OFDM transmission, wherein the OFDM transmission is received from a transmitter via a communication channel;
detecting a mode and a guard length for the OFDM transmission based on the at least one metric, the mode indicating the duration of a useful portion of each OFDM symbol in the OFDM transmission and the guard length indicating the duration of a guard interval for each OFDM symbol, wherein an actual mode and an actual guard length used by the transmitter for the OFDM transmission are unknown during performance of said method prior to said detecting; and
processing the samples in accordance with the detected mode and guard length: and
further comprising
determining energy for at least one hypothesis corresponding to a different combination of mode and guard length hypothesized for the OFDM transmission to derive a first metric based on the correlation results and the energy;
filtering the first metric to estimate the noise based on a set of elements for the filtered first metric; and
deriving the at least one metric based on the filtered first metric and the estimated noise.

15. The method of claim 14, wherein the deriving the at least one metric comprises deriving the at least one metric for multiple hypotheses, each hypothesis corresponding to a different combination of mode and guard length hypothesized for the OFDM transmission, and wherein the detecting the mode and the guard length comprises
- identifying a most likely hypothesis based on the at least one metric, and
- providing the mode and guard length for the identified hypothesis as the detected mode and guard length for the OFDM transmission.

16. The method of claim 14, wherein the deriving the at least one metric comprises
- performing correlation for a guard interval for the hypothesis to obtain correlation results for the hypothesis,
- estimating noise for the hypothesis, and
- deriving the at least one metric for the hypothesis based on the correlation results and the estimated noise for the hypothesis.

17. An apparatus comprising:
- means for deriving at least one metric by combining at least one of noise information and energy information associated with an OFDM transmission with correlation results associated with samples of the OFDM transmission, wherein the OFDM transmission is received from a transmitter via a communication channel;
- means for detecting a mode and a guard length for the OFDM transmission based on the at least one metric, the mode indicating the duration of a useful portion of each OFDM symbol in the OFDM transmission and the guard length indicating the duration of a guard interval for each OFDM symbol, wherein an actual mode and an actual guard length used by the transmitter for the OFDM transmission are unknown to said apparatus prior to said detecting; and means for processing the samples in accordance with the detected mode and guard length; and further comprising:
- means for determining energy for at least one hypothesis corresponding to a different combination of mode and guard length hypothesized for the OFDM transmission to derive a first metric based on the correlation results and the energy;
- means for filtering the first metric to estimate the noise based on a set of elements for the filtered first metric; and
- means for deriving the at least one metric based on the filtered first metric and the estimated noise.

18. The apparatus of claim 17, wherein the means for deriving the at least one metric comprises means for deriving the at least one metric for multiple hypotheses, each hypothesis corresponding to a different combination of mode and guard length hypothesized for the OFDM transmission, and wherein the means for detecting the mode and the guard length comprises
- means for identifying a most likely hypothesis based on the at least one metric, and
- means for providing the mode and guard length for the identified hypothesis as the detected mode and guard length for the OFDM transmission.

19. The apparatus of claim 17, wherein the means for deriving the at least one metric comprises
- means for performing correlation for a guard interval for the hypothesis to obtain correlation results for the hypothesis,
- means for estimating noise for the hypothesis, and
- means for deriving the at least one metric for the hypothesis based on the correlation results and the estimated noise for the hypothesis.

20. An apparatus comprising:
- at least one processor configured to derive a first metric for each of multiple hypotheses based on samples for an OFDM transmission received from a transmitter via a communication channel, each hypothesis corresponding to a different combination of mode and guard length hypothesized for the OFDM transmission, to estimate a timing offset of the OFDM transmission for each hypothesis based on the first metric for the hypothesis, to derive a second metric for each hypothesis by combining the first metric and the estimated timing offset for the hypothesis, and to detect a mode and a guard length for the OFDM transmission based on the second metric, wherein an actual mode and an actual guard length used by the transmitter for the OFDM transmission are unknown to said apparatus prior to said detection;
- for each of the multiple hypotheses the at least one processor is configured to filter the first metric for the hypothesis, to estimate noise for the hypothesis based on the filtered first metric and the estimated timing offset for the hypothesis, and to derive the second metric for the hypothesis based on the filtered first metric and the estimated noise for the hypothesis; and
- a memory coupled to the at least one processor.

21. The apparatus of claim 20, wherein for each of the multiple hypotheses the at least one processor is configured to perform correlation for a guard interval for the hypothesis to obtain correlation results for the hypothesis, to determine energy of the guard interval for the hypothesis, and to derive the first metric for the hypothesis based on the correlation results and the energy for the hypothesis.

22. The apparatus of claim 21, wherein for each of the multiple hypotheses the at least one processor is configured to estimate a timing offset for the hypothesis, and to estimate the noise for the hypothesis based on a set of elements for the filtered first metric at locations determined by the estimated timing offset for the hypothesis.

23. The apparatus of claim 20, wherein the at least one processor is configured to estimate a timing offset for the OFDM transmission based on the second metric.

24. An apparatus comprising:
- means for deriving a first metric for each of multiple hypotheses based on samples for an OFDM transmission received from a transmitter via a communication channel, each hypothesis corresponding to a different combination of mode and guard length hypothesized for the OFDM transmission;
- means for estimating a timing offset of the OFDM transmission for each hypothesis based on the first metric for the hypothesis;
- means for deriving a second metric for each hypothesis by combining the first metric and the estimated timing offset for the hypothesis; and
- means for detecting a mode and a guard for the OFDM transmission based on the second metric;
- means for filtering the first metric for the hypothesis,
- means for estimating noise for the hypothesis based on the filtered first metric and the estimated timing offset for the hypothesis, and
- means for deriving the second metric for the hypothesis based on the filtered first metric and the estimated noise for the hypothesis;

wherein an actual mode and an actual guard length used by the transmitter for the OFDM transmission are unknown to said apparatus prior to said detecting.

25. The apparatus of claim 24, wherein the means for deriving the first metric comprises
means for performing correlation for a guard interval for the hypothesis to obtain correlation results for the hypothesis,
means for determining energy of the guard interval for the hypothesis, and
means for deriving the first metric for the hypothesis based on the correlation results and the energy for the hypothesis.

26. An apparatus comprising:
at least one processor configured to compute at least one parameter for each of multiple hypotheses based on samples for an OFDM transmission received from a transmitter via a communication channel, wherein each hypothesis corresponds to a different combination of mode and guard length hypothesized for the OFDM transmission, and to derive a metric for each of the multiple hypotheses based on the at least one parameter for the hypothesis, wherein for at least one hypothesis a fraction of the samples is used to compute the at least one parameter or a fraction of elements available for the metric is stored, and wherein for each of the at least one hypothesis the at least one processor is configured to perform correlation using a fraction of samples available for the hypothesis, and an actual mode and an actual guard length used by the transmitter for the OFDM transmission are unknown to said apparatus; and
wherein the metric for at least one hypothesis of the multiple hypotheses may be further derived by:
determining energy for a hypothesized guard interval to derive a first metric based on the correlation results and the energy;
filtering the first metric to estimate the noise based on a set of elements for the filtered first metric; and
deriving the metric based on the filtered first metric and the estimated noise; and a memory coupled to the at least one processor.

27. The apparatus of claim 26, wherein for each of the at least one hypothesis the at least one processor is configured to perform correlation using a fraction of samples taken from across a hypothesized guard interval for the hypothesis.

28. The apparatus of claim 26, wherein the multiple hypotheses cover at least two different guard lengths, and wherein the at least one processor is configured to perform correlation on equal number of samples for the multiple hypotheses.

29. The apparatus of claim 26, wherein for each of the at least one hypothesis the at least one processor is configured to derive the metric for a fraction of timing offsets possible for the hypothesis.

30. The apparatus of claim 26, wherein for each of the at least one hypothesis the at least one processor is configured to derive the metric with equal time resolution relative to OFDM symbol size for the multiple hypotheses.

31. An apparatus comprising:
means for computing at least one parameter for each of multiple hypotheses based on samples for an OFDM transmission received from a transmitter via a communication channel, wherein each hypothesis corresponds to a different combination of mode and guard length hypothesized for the OFDM transmission, and further including means for performing correlation using a fraction of samples available for the hypothesis; and
means for deriving a metric for each of the multiple hypotheses based on the at least one parameter for the hypothesis, wherein for at least one hypothesis a fraction of the samples is used to compute the at least one parameter or a fraction of elements available for the metric is stored, and wherein an actual mode and an actual guard length used by the transmitter for the OFDM transmission are unknown to said apparatus; and
wherein the means for deriving the metric further comprises:
means for determining energy for a hypothesized guard interval to derive a first metric based on the correlation results and the energy;
means for filtering the first metric to estimate the noise based on a set of elements for the filtered first metric; and
means for deriving the metric based on the filtered first metric and the estimated noise.

32. The apparatus of claim 31, wherein the means for deriving the metric comprises means for deriving the metric for a fraction of timing offsets possible for the hypothesis.

33. An apparatus comprising:
at least one processor configured to perform correlation on samples for an OFDM transmission received from a transmitter via a communication channel to obtain first correlation results for a first hypothesis with a first guard length, and to combine the first correlation results to obtain second correlation results for a second hypothesis with a second guard length that is longer than the first guard length; and
the at least one processor configured to compute energies for a first guard interval for the first hypothesis, and to combine the energies for the first guard interval to obtain energies for a second guard interval for the second hypothesis; and
a memory coupled to the at least one processor;
wherein an actual guard length used by the transmitter for the OFDM transmission is unknown to said apparatus.

34. The apparatus of claim 33, wherein the second guard length is twice as long as the first guard length.

35. The apparatus of claim 33, wherein the at least one processor is configured to combine the second correlation results to obtain third correlation results for a third hypothesis with a third guard length that is longer than the second guard length.

* * * * *